US008866495B2

(12) United States Patent
Baarman et al.

(10) Patent No.: US 8,866,495 B2
(45) Date of Patent: Oct. 21, 2014

(54) SPATIAL TRACKING SYSTEM AND METHOD

(75) Inventors: David W. Baarman, Fennville, MI (US); Joshua K. Schwannecke, Grand Rapids, MI (US); William T. Stoner, Jr., Ada, MI (US); Scott A. Gauche, Clarkston, MI (US); Ryan Joseph Nussbaum, Grand Rapids, MI (US); Nicholas J. VanderStel, Twin Lake, MI (US); Jeffrey Lee VanOss, Holland, MI (US)

(73) Assignee: Access Business Group International LLC, Ada, MI (US)

( * ) Notice: Subject to any disclaimer, the term of this patent is extended or adjusted under 35 U.S.C. 154(b) by 633 days.

(21) Appl. No.: 12/827,258

(22) Filed: Jun. 30, 2010

(65) Prior Publication Data
US 2012/0001644 A1 Jan. 5, 2012

(51) Int. Cl.
G01R 27/04 (2006.01)
G01D 5/20 (2006.01)

(52) U.S. Cl.
CPC ............ *G01D 5/2066* (2013.01); *G01D 5/2073* (2013.01); *G01D 5/2086* (2013.01)
USPC ...... 324/629; 324/207.24; 320/104; 320/108; 320/139; 340/539.3

(58) Field of Classification Search
USPC ........................................................ 324/629
See application file for complete search history.

(56) References Cited

U.S. PATENT DOCUMENTS

| 4,287,809 | A | * | 9/1981 | Egli et al. ...................... 89/41.21 |
| 5,339,259 | A | * | 8/1994 | Puma et al. .................... 702/153 |
| 5,495,427 | A | * | 2/1996 | Puma et al. .................... 367/117 |
| 6,249,234 | B1 | | 6/2001 | Ely et al. |
| 7,046,215 | B1 | * | 5/2006 | Bartlett ............................. 345/8 |
| 7,126,450 | B2 | | 10/2006 | Baarman et al. |
| 7,132,918 | B2 | * | 11/2006 | Baarman et al. ............. 336/188 |
| 7,180,248 | B2 | | 2/2007 | Kuennen et al. |
| 7,212,414 | B2 | | 5/2007 | Baarman |
| 7,262,700 | B2 | * | 8/2007 | Hsu ............................. 340/572.1 |
| 7,518,267 | B2 | | 4/2009 | Baarman |
| 7,522,878 | B2 | | 4/2009 | Baarman |
| 7,532,901 | B1 | * | 5/2009 | LaFranchise et al. ..... 455/456.6 |
| 7,612,528 | B2 | | 11/2009 | Baarman et al. |

(Continued)

FOREIGN PATENT DOCUMENTS

DE 102004027954 12/2005
EP 1947423 7/2008

OTHER PUBLICATIONS

Honeywell Datasheet for 3-Axis Digital Compass IC, HMC5843, Feb. 2009, 2009 Honeywell International Inc.

(Continued)

*Primary Examiner* — Benjamin M Baldridge
(74) *Attorney, Agent, or Firm* — Warner Norcross & Judd LLP

(57) ABSTRACT

The specification discloses a simple and effective system for tracking position and rotation of an object or portable device located within an electromagnetic field. The electromagnetic field may be produced by a primary coil, which inductively couples with one or more secondary coils located within a portable device. The relative strength of this inductive coupling may be used to determine the position, rotation, or both of the portable device relative to the primary coil.

20 Claims, 18 Drawing Sheets

(56) References Cited

U.S. PATENT DOCUMENTS

| | | | |
|---|---|---|---|
| 7,772,839 B2* | 8/2010 | Watson et al. | 324/228 |
| 8,446,046 B2* | 5/2013 | Fells et al. | 307/104 |
| 2002/0077752 A1* | 6/2002 | Burreson et al. | 701/300 |
| 2004/0222801 A1* | 11/2004 | Becker et al. | 324/655 |
| 2006/0202665 A1* | 9/2006 | Hsu | 320/139 |
| 2008/0048829 A1* | 2/2008 | Nakajima et al. | 340/5.72 |
| 2009/0082614 A1* | 3/2009 | Feucht | 600/14 |
| 2009/0146608 A1* | 6/2009 | Lee | 320/108 |
| 2009/0284369 A1* | 11/2009 | Toncich et al. | 340/539.3 |
| 2009/0319212 A1* | 12/2009 | Cech et al. | 702/65 |
| 2010/0141245 A1* | 6/2010 | Lee | 324/207.24 |
| 2010/0171461 A1* | 7/2010 | Baarman et al. | 320/108 |
| 2010/0207611 A1* | 8/2010 | Thoss et al. | 324/207.15 |

OTHER PUBLICATIONS

Analog Devices Datasheet for Digital Accelerometer ADXL345, 2009 Analog Devices, Inc.
ST Datasheet for LPR530AL, Jul. 2009, Doc ID 15812 Rev 2.
ST Datasheet for LY530ALH, Jul. 2009, Doc ID 15801 Rev 2.
Written Opinion and International Search Report dated Nov. 2, 2011 for International Application No. PCT/US2011/042005.
http://www.sparkfun.com/commerce/product_info.pho?products_id=9623, retrieved on Jun. 30, 2010.

* cited by examiner

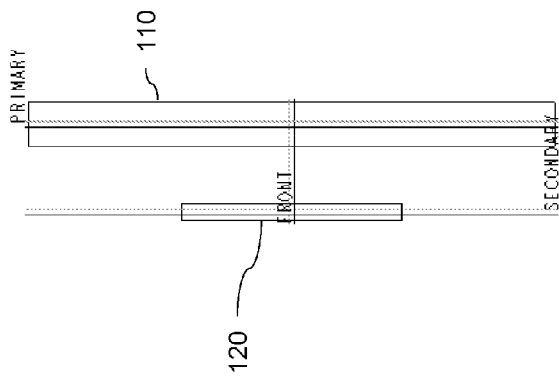
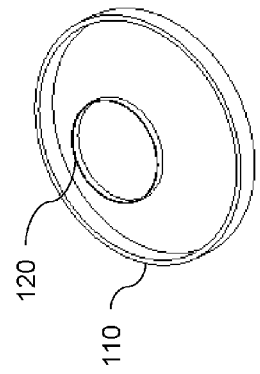
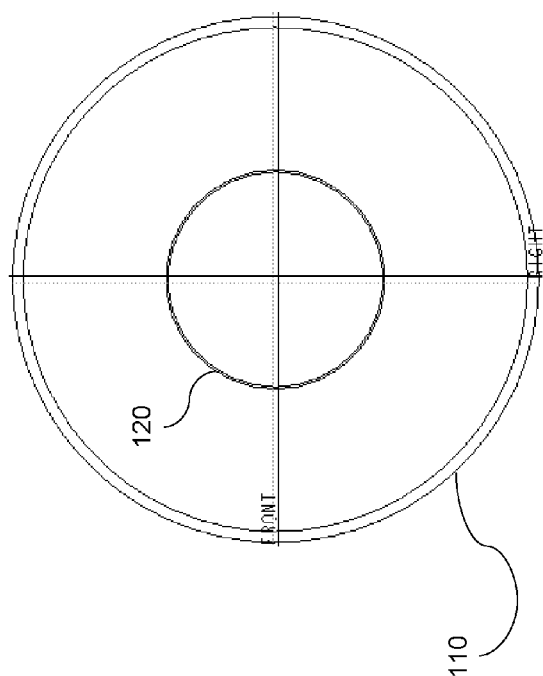
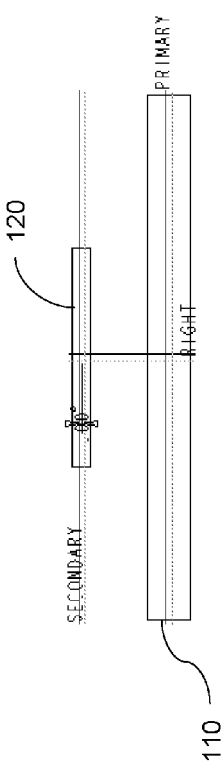

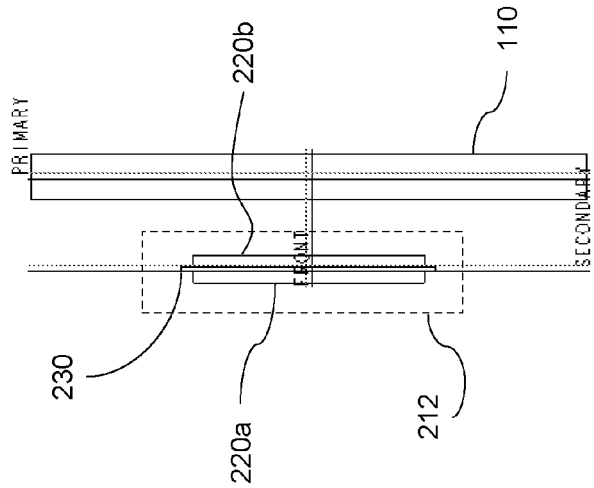
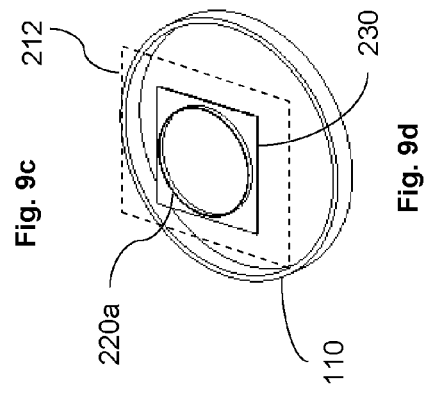
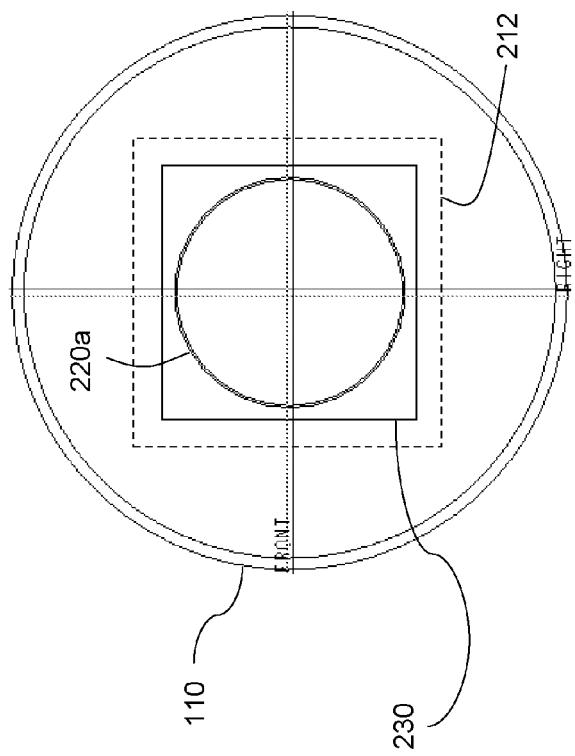
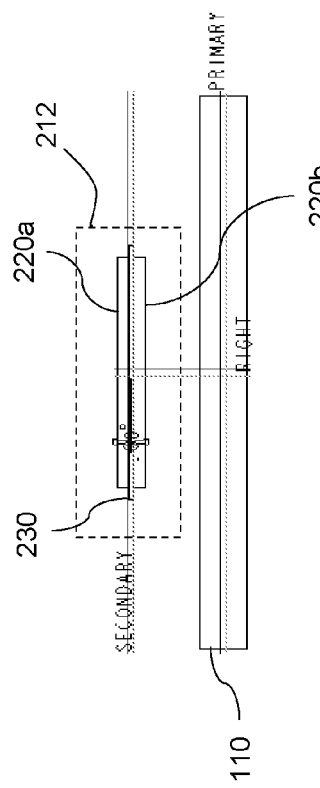

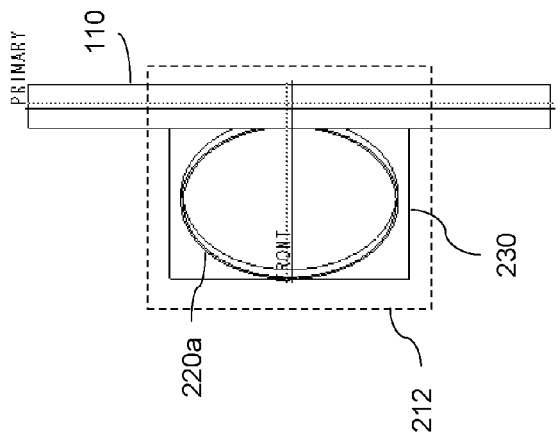
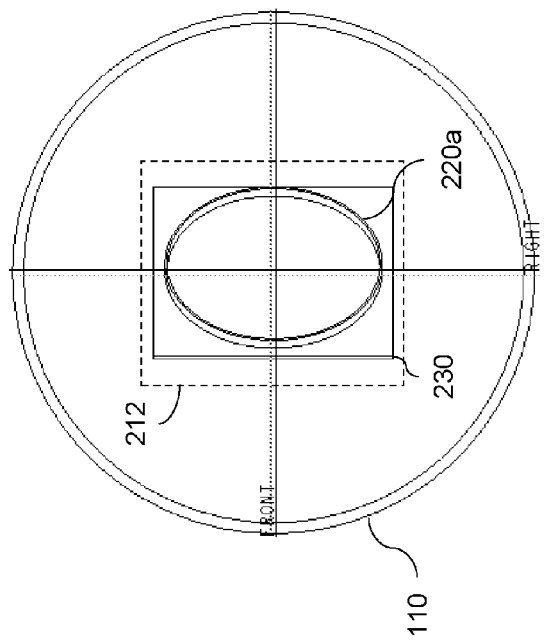
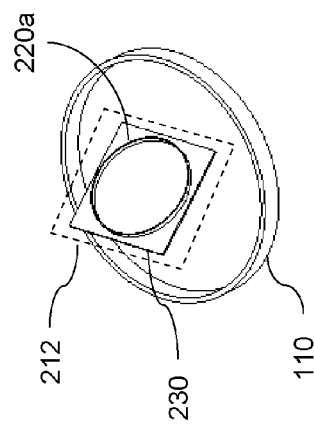
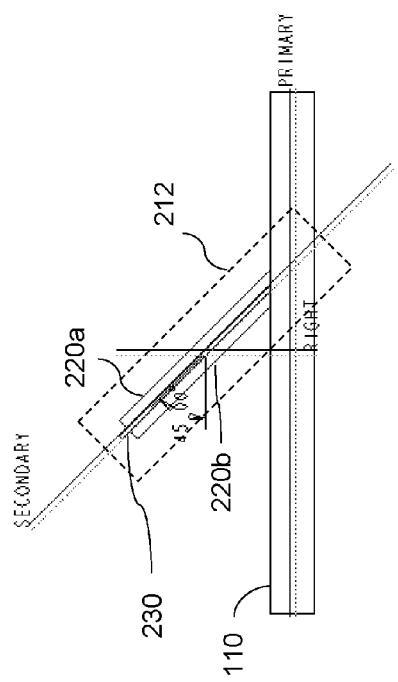
Fig. 10c
Fig. 10d
Fig. 10b
Fig. 10a

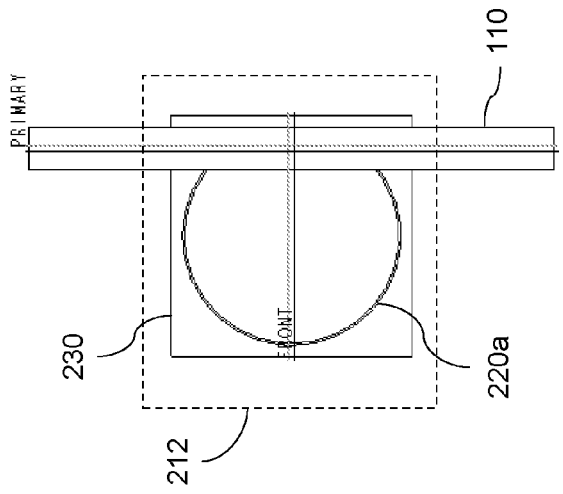
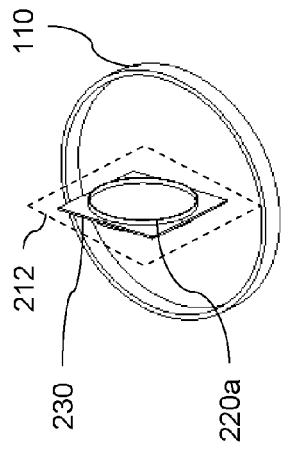
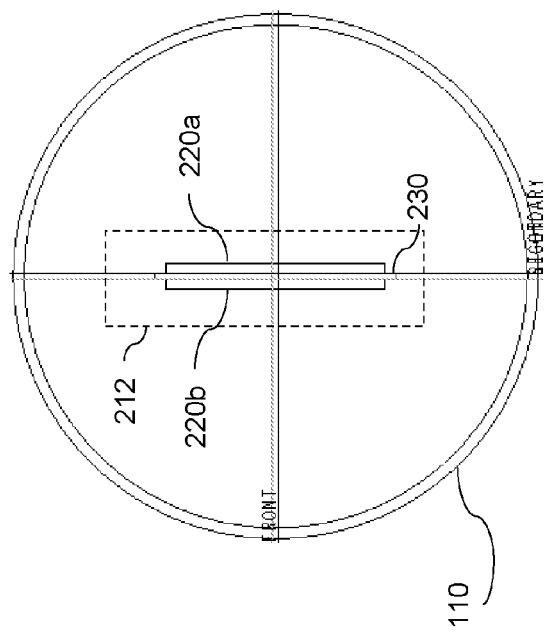
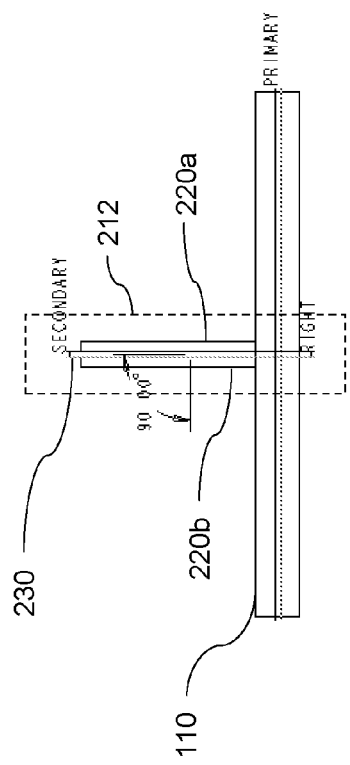
Fig. 11c
Fig. 11d
Fig. 11b
Fig. 11a

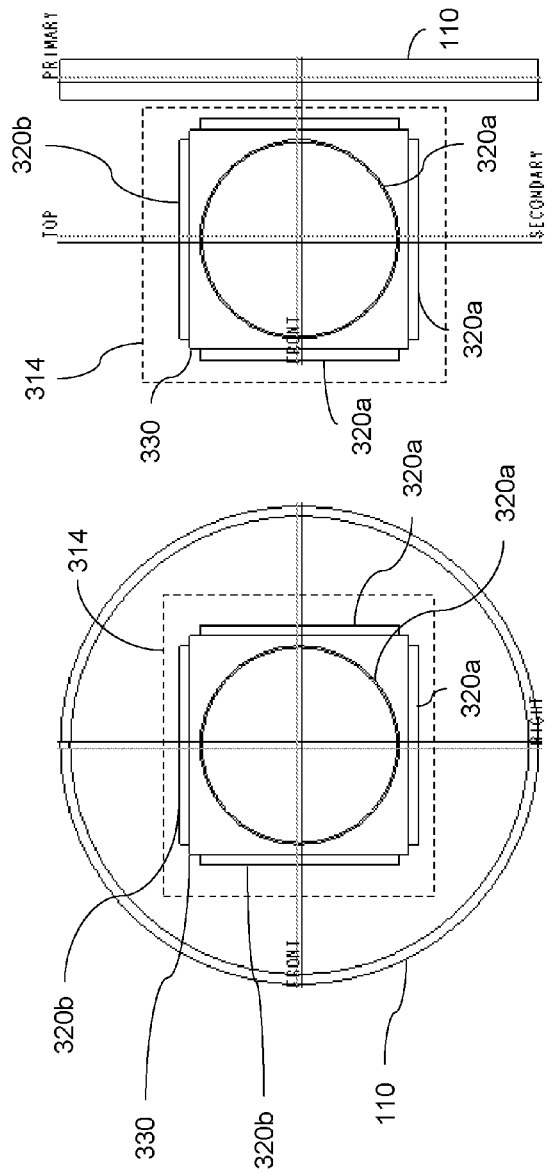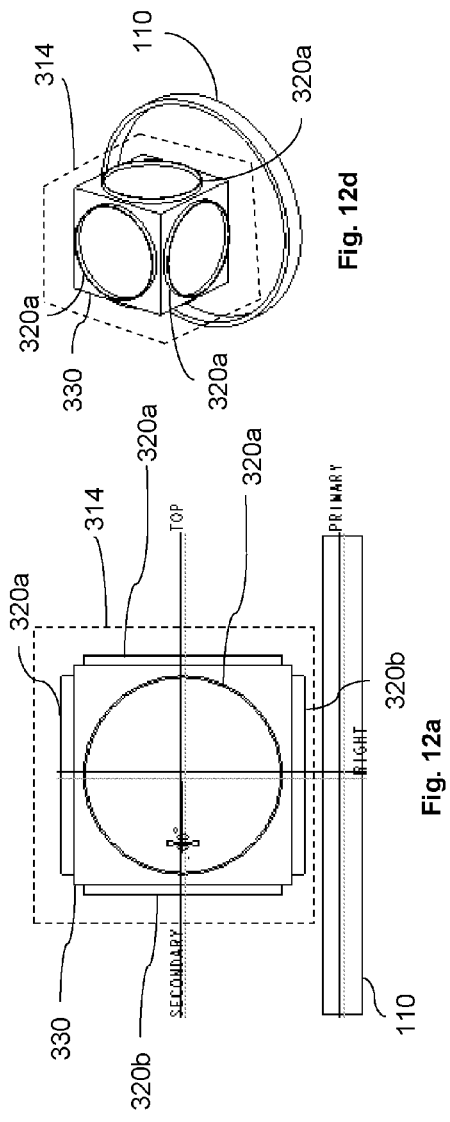

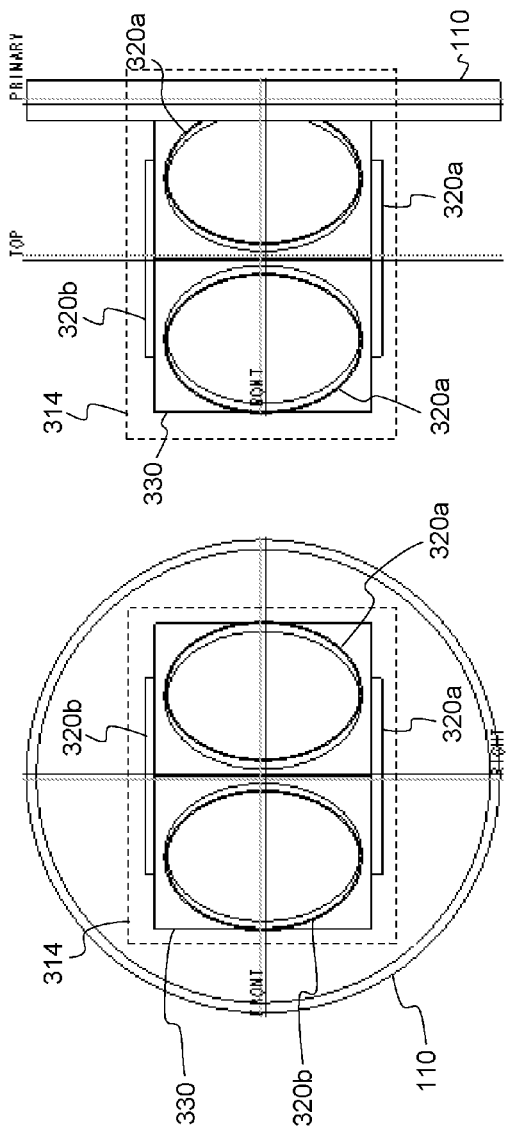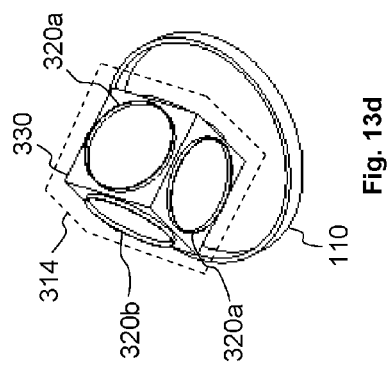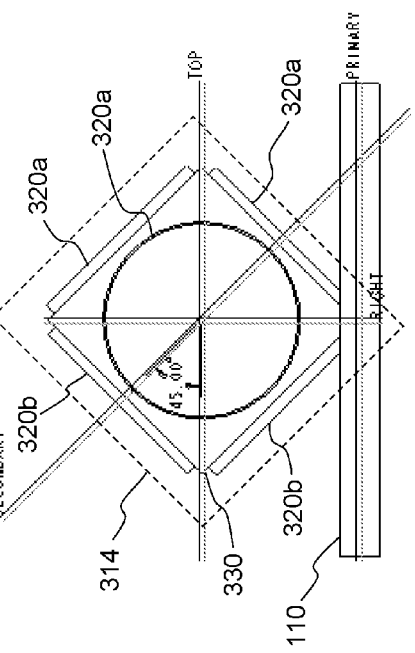

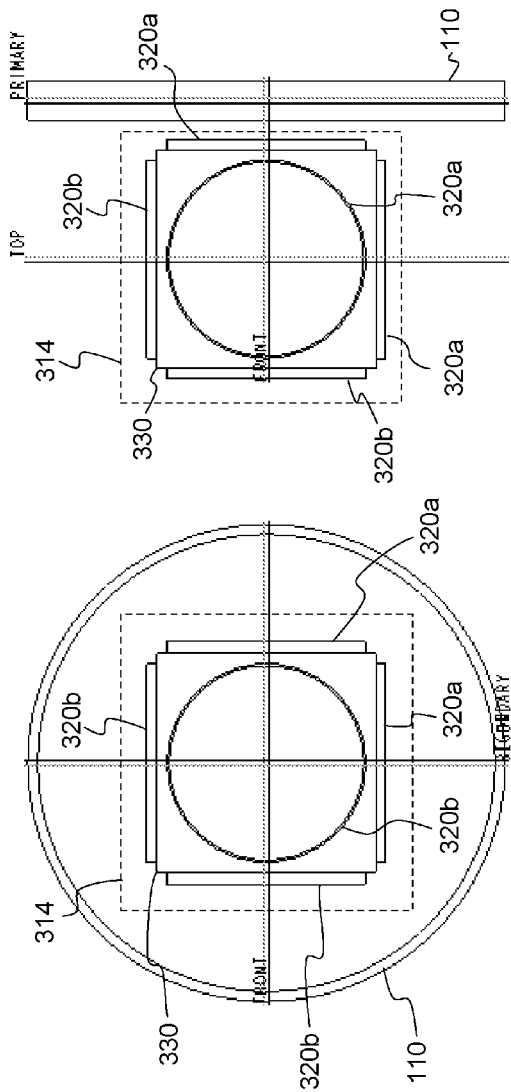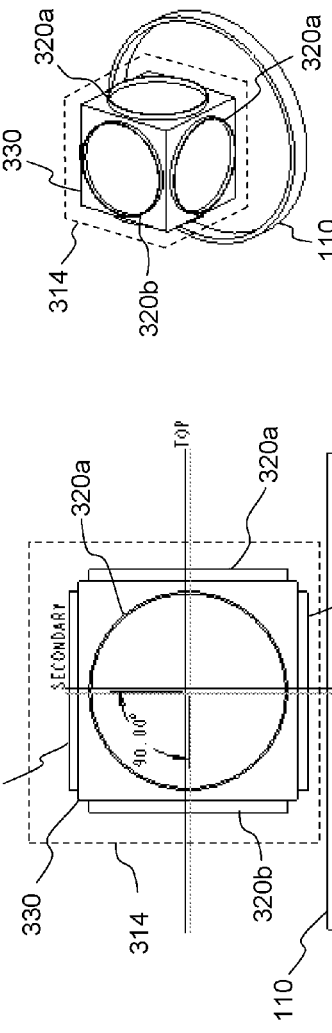

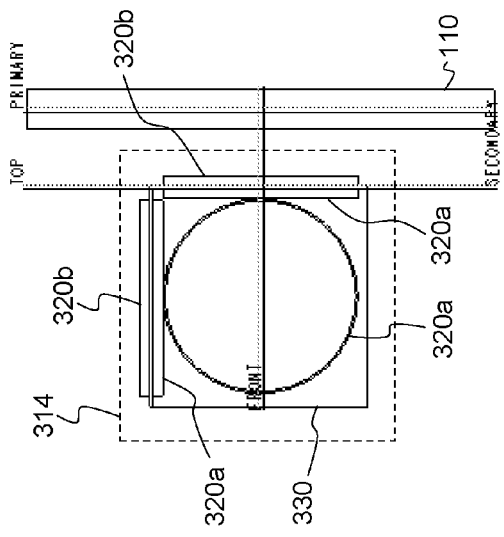
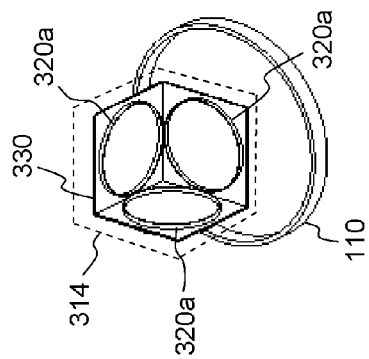
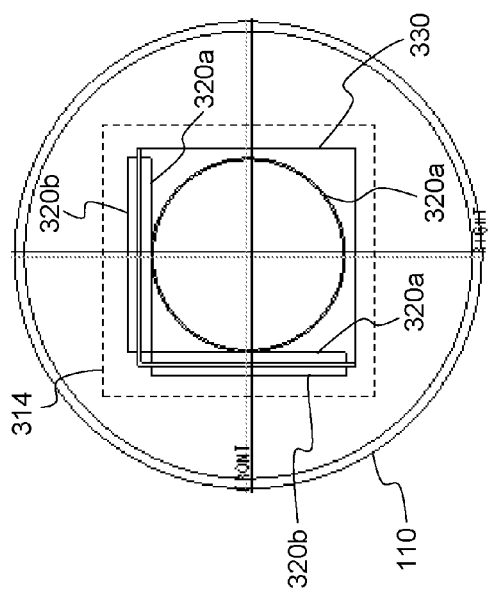
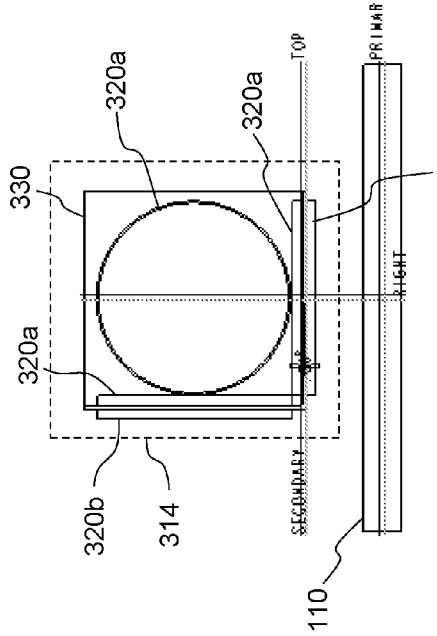
Fig. 15a
Fig. 15b
Fig. 15c
Fig. 15d

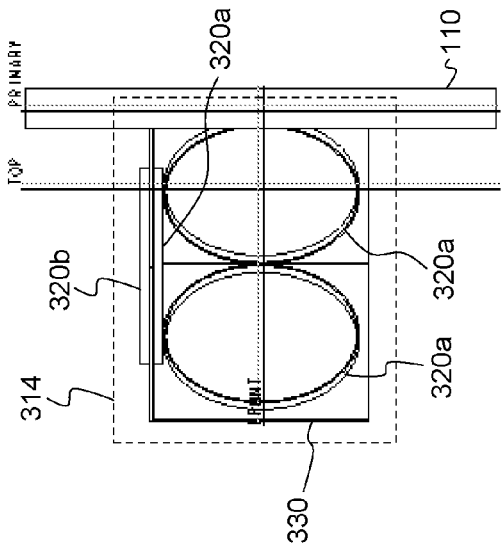
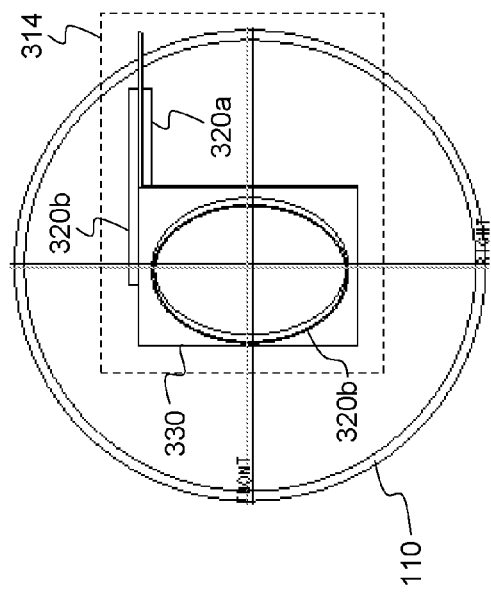
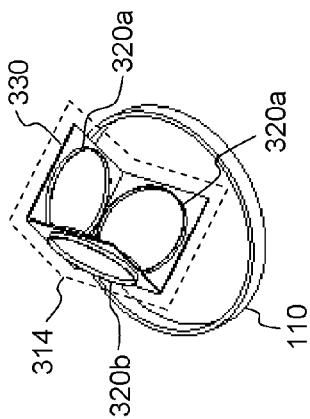
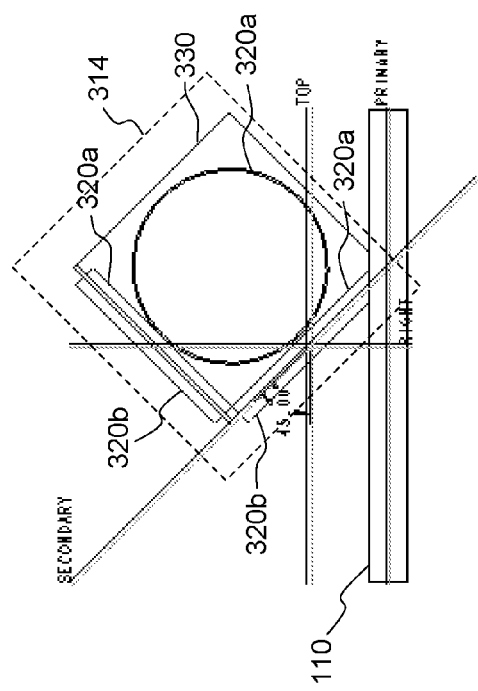
Fig. 16c
Fig. 16d
Fig. 16b
Fig. 16a

Position Table

| A/D Voltage | | | Angle on Axis | | |
|---|---|---|---|---|---|
| L1 | L2 | L3 | X | Y | Z |
| 0 | | | 90.00 | | |
| 1 | | | 78.75 | | |
| 2 | | | 67.50 | | |
| 3 | | | 56.25 | | |
| 4 | | | 45.00 | | |
| 5 | | | 33.75 | | |
| 6 | | | 22.50 | | |
| 7 | | | 11.25 | | |
| 8 | | | 0.00 | | |
| | 0 | | | 90.00 | |
| | 1 | | | 78.75 | |
| | 2 | | | 67.50 | |
| | 3 | | | 56.25 | |
| | 4 | | | 45.00 | |
| | 5 | | | 33.75 | |
| | 6 | | | 22.50 | |
| | 7 | | | 11.25 | |
| | 8 | | | 0.00 | |
| | | 0 | | | 90.00 |
| | | 1 | | | 78.75 |
| | | 2 | | | 67.50 |
| | | 3 | | | 56.25 |
| | | 4 | | | 45.00 |
| | | 5 | | | 33.75 |
| | | 6 | | | 22.50 |
| | | 7 | | | 11.25 |
| | | 8 | | | 0.00 |

Fig. 18

SPATIAL TRACKING SYSTEM AND METHOD

FIELD OF THE INVENTION

The present invention relates to wireless power systems, and more particularly to wireless power systems including spatial tracking capabilities.

BACKGROUND OF THE INVENTION

Spatial tracking systems allow applications to capture data about an object's position or a characteristic of position. Position can be one or more characteristics of position and can be relative, absolute, or a combination of both, depending on the spatial tracking system. Relative position is the position of the object in relation to an initial location, and may be determined based on resolving motion of the object in terms of directional vectors. Dead reckoning systems use relative position to determine spatial information about an object. Absolute position is the position of the object within the spatial tracking system, and may be determined without prior knowledge of where the object has been. Accordingly, absolute position is not dependent on knowledge of an initial location or state.

In many applications, spatial tracking systems provide multi-axis information to track position and rotation about three axes. This type of tracking system may be called a six-axis tracking system. For example, a two-axis spatial tracking system with position and rotation sensors may determine the position of an object along an axis, such as +5 units along the X-axis. Further, that object may have a rotational angle about the axis, such as 45° about the X-axis. This two-axis spatial tracking system may be further expanded to determine position and rotation in three axes, such as the X-axis, Y-axis, and Z-axis, to yield a six-axis tracking system. An example coordinate system that may facilitate determining rotation and position is shown in FIG. 3 with X, Y, and Z axes and corresponding θx, θy, and θz rotational angles. The corresponding θx, θy, and θz rotational angles are also known respectively as pitch, roll, and yaw.

Spatial tracking systems capable of determining position and rotation of an object in space have been used in hosts of applications, including computers, video game systems, remote controlled devices, and robots. Other applications with spatial tracking systems include joysticks, computer mice, or video game controller. In many of these applications, a portable device determines position and rotation of itself and provides this information to an external device, such as a personal computer, for further processing. In other applications, the external device may determine position and rotation of the portable device based on raw sensor information relayed from the portable device.

Many solutions for determining position and rotation of a portable device use sensors located within the portable device. For example, portable devices may include sensors such as at least one of a potentiometer, a Hall effect sensor, a rotary encoder, a camera, an infrared sensor, a gyroscope, and an accelerometer to determine position and rotation. However, many portable devices using these sensors exhibit user interface problems related to controlling the portable device in a simple manner. For example, a computer mouse used to control multiple axes may use certain click and drag combinations to inform the external device which axis to perform a motion in. These types of complex movements may not be intuitive to the user, which detracts from the portable device's usability.

Spatial tracking systems that use cameras or infrared sensors often experience similar usability drawbacks because of environmental factors. Cameras and infrared sensors may have difficulty producing viable information when not placed in a controlled environment. A camera or infrared sensor may be susceptible to ambient light changes such that sensor output may be distorted or unusable for processing by the external device. Additionally, the camera or infrared sensor may cease to function if used with an unsuitable surface or if the sensor becomes blocked.

Accelerometers also have been used to determine position and rotation in spatial tracking systems. An accelerometer can measure instantaneous acceleration along an axis, which if integrated twice yields displacement or relative position. Put another way, accelerometers do not measure position directly, but can determine displacement through integration of acceleration data. Displacement is the movement of an object relative to an initial position. If three accelerometers that are orthogonal to each other are used to determine position, then displacement in three-dimensional space may be determined using their outputs. A spatial tracking system may also use the effect of gravity on the accelerometers to determine rotation about an axis.

Configurations using accelerometers also have limitations. Integrating acceleration information twice to produce a position may introduce errors that cause the spatial tracking system to lose accuracy quickly. The first integration operation of acceleration to velocity may introduce some amount of error. The second integration operation of velocity to position may integrate this error to introduce even more error. These errors may result in the system determining that the portable device is moving even though the portable device is at rest.

This effect is known as drift. As a result, algorithms and other sensors, such as gyroscopes, have been used in combination with accelerometers to produce a spatial tracking system capable of determining position and rotation. However, these additional sensors may also be prone to drift, and so even more additional sensors, such as a magnetometers, may be used to improve accuracy of the spatial tracking system. These additional sensors can increase the cost and complexity of the portable device.

In addition to spatial tracking systems discussed above, wireless power systems are known for transferring power wirelessly in hosts of applications, including wireless power transfer to portable devices. Wireless power supply systems enable power to be transferred without direct electrical connections using inductive coupling between inductors or coils. Many applications have used this capability to transfer power wirelessly. The prior art shown in FIGS. 1 and 2 shows one example of a wireless power system in which a portable device may receive power from a primary coil using three orthogonal secondary coils. The wireless power supply may be designed to drive the primary coil to achieve efficient wireless power transfer between the wireless power supply and the portable device. This wireless power system may be configured to allow the portable device to receive power from the primary coil via inductive coupling despite the orientation of the portable device relative to the primary coil. This wireless power system, however, is not configured to determine position or rotation of the portable device.

Additionally, wireless power systems can affect performance of sensors used for determining position and rotation. The magnetic field used for inductive coupling between the wireless power supply and the portable device(s) may prevent some sensors from producing an accurate output. For example, a magnetometer used to measure the earth's magnetic field may cease to function inside the magnetic field of the wireless power system. Accordingly, complex and expensive sensor systems may be used to both transfer power wirelessly to the portable device and determine position and rotation of the portable device.

SUMMARY OF THE INVENTION

The present invention provides a simple and effective system for tracking position and rotation of an object or portable device located within an electromagnetic field. The electromagnetic field may be produced by a primary coil, which inductively couples with one or more secondary coils located within a portable device. The relative strength of the inductive coupling may be used to determine the position, rotation, or both of the portable device relative to the primary coil.

In one embodiment, the portable device may wirelessly receive power for supplying energy to its circuitry using at least one secondary coil. Further, the portable device may use the at least one secondary coil to determine spatial information about the portable device. The strength of inductive coupling between the at least one secondary coil and the primary coil may aid in determining the position, rotation, or both of the portable device. For example, the strength of inductive coupling between a secondary coil and the primary coil changes as the angle of the secondary coil changes relative to the primary coil. Additionally, the strength of inductive coupling also changes as the secondary coil moves farther from the primary coil. This information may be used to determine spatial information about the portable device relative to the primary coil.

In another embodiment, the portable device may include three secondary coils that are mutually orthogonal to each other. This configuration may allow the spatial tracking system to 1) transfer power wirelessly to the portable device regardless of its orientation relative to the primary coil and 2) determine position, rotation, or both of the portable device about multiple axes. For example, the spatial tracking system might determine pitch, roll, and distance of the portable device relative to the primary coil.

In another embodiment, the portable device may include at least one secondary coil and at least one additional sensor. The spatial tracking system may determine position, rotation, or both for a portable device based on the additional sensor information and sensor readings correlating to the strength of inductive coupling between the primary coil and the at least one secondary coil. The at least one additional sensor may include at least one accelerometer, at least one gyroscope, or at least one other sensor capable of outputting spatial information about the portable device.

In another embodiment, a portable device may include at least one pair of secondary coils separated by a shield. The shield may appreciably affect the strength of inductive coupling between the at least one pair of secondary coils based on their orientation relative to the primary coil. When the at least one pair of secondary coils are in one orientation, one secondary coil in a pair may more strongly couple with the primary coil than the other coil in the pair. In other orientations, the other secondary coil may more strongly couple. Using this configuration, the spatial tracking system may determine rotation of the portable device from 0° to 360° about at least one axis based on the strength of inductive coupling between the at least one pair of secondary coils and the primary coil.

In another embodiment, the portable device may include three pairs of secondary coils, with each pair of secondary coils including a shield. The shields may form a near cubical shape or a near corner cube shape so that each pair of secondary coils is orthogonal with respect to each other. This configuration may allow the spatial tracking system to determine position, rotation, or both about a portable device in multiple axes. More particularly, this configuration may be used to determine rotation of the portable device from 0° to 360° about multiple axes based on the strength of inductive coupling between each secondary coil in each of the three pairs of secondary coils.

The present invention provides a simple and effective configuration for determining position, rotation, or both about a portable device located within an electromagnetic field. Spatial information derived from the characteristics of inductive coupling between a secondary coil and a primary coil may also be used in combination with other sensors to compensate for sensor drift or improve accuracy. Moreover, the present invention may supplement or replace sensors that are adversely affected by the presence of an electromagnetic field capable of transferring power wirelessly. Finally, this configuration may also provide additional benefit in the use of overlapping components for sensing spatial information and providing power to a portable device.

These and other advantages and features of the invention will be more fully understood and appreciated by reference to the description of the embodiments and the drawings.

BRIEF DESCRIPTION OF THE DRAWINGS

FIG. 7a is a front view of a near 0° arrangement of a secondary circuit relative to a primary coil plane of a second embodiment of the spatial tracking system.

FIG. 7b is a top view of that.

FIG. 7c is a side view of that.

FIG. 7d is a perspective view of that.

FIG. 8b is a top view of that.

FIG. 8c is a side view of that.

FIG. 8d is a perspective view of that.

FIG. 9a is a front view of a near 0° arrangement of a secondary circuit relative to a primary coil plane of a third embodiment of the spatial tracking system.

FIG. 9b is a top view of that.

FIG. 9c is a side view of that.

FIG. 9d is a perspective view of that.

FIG. 10a is a front view of a near 45° arrangement of the secondary circuit relative to the primary coil plane of the third embodiment of the spatial tracking system.

FIG. 10b is a top view of that.

FIG. 10c is a side view of that.

FIG. 10d is a perspective view of that.

FIG. 11a is a front view of a near 90° arrangement of the secondary circuit relative to the primary coil plane of the third embodiment of the spatial tracking system.

FIG. 11b is a top view of that.

FIG. 11c is a side view of that.

FIG. 11d is a perspective view of that.

FIG. 12a is a front view of a near 0° arrangement of an X-axis coil of a secondary circuit relative to a primary coil plane of a fourth embodiment of the spatial tracking system.

FIG. 12b is a top view of that.

FIG. 12c is a side view of that.

FIG. 12d is a perspective view of that.

FIG. 13a is a front view of a near 45° arrangement of the X-axis coil of the secondary circuit relative to the primary coil plane of the fourth embodiment of the spatial tracking system.

FIG. 13b is a top view of that.

FIG. 13c is a side view of that.

FIG. 13d is a perspective view of that.

FIG. 14a is a front view of a near 90° arrangement of the X-axis coil of the secondary circuit relative to the primary coil plane of the fourth embodiment of the spatial tracking system.

FIG. 14b is a top view of that.

FIG. 14c is a side view of that.

FIG. 14d is a perspective view of that.

FIG. 15a is a front view of a near 0° arrangement of an X-axis coil of a secondary circuit relative to a primary coil plane of a fifth embodiment of the spatial tracking system.

FIG. 15b is a top view of that.

FIG. 15c is a side view of that.

FIG. 15d is a perspective view of that.

FIG. 16a is a front view of a near 45° arrangement of the X-axis coil of the secondary circuit relative to the primary coil plane of the fifth embodiment of the spatial tracking system.

FIG. 16b is a top view of that.

FIG. 16c is a side view of that.

FIG. 16d is a perspective view of that.

FIG. 17b is a top view of that.

FIG. 17c is a side view of that.

FIG. 17d is a perspective view of that.

FIG. 18 is a table showing an analog-to-digital voltage output representing strength of inductive coupling as a function of rotational angle for the first embodiment of the spatial tracking system.

DESCRIPTION OF THE CURRENT EMBODIMENTS

Figure 1:
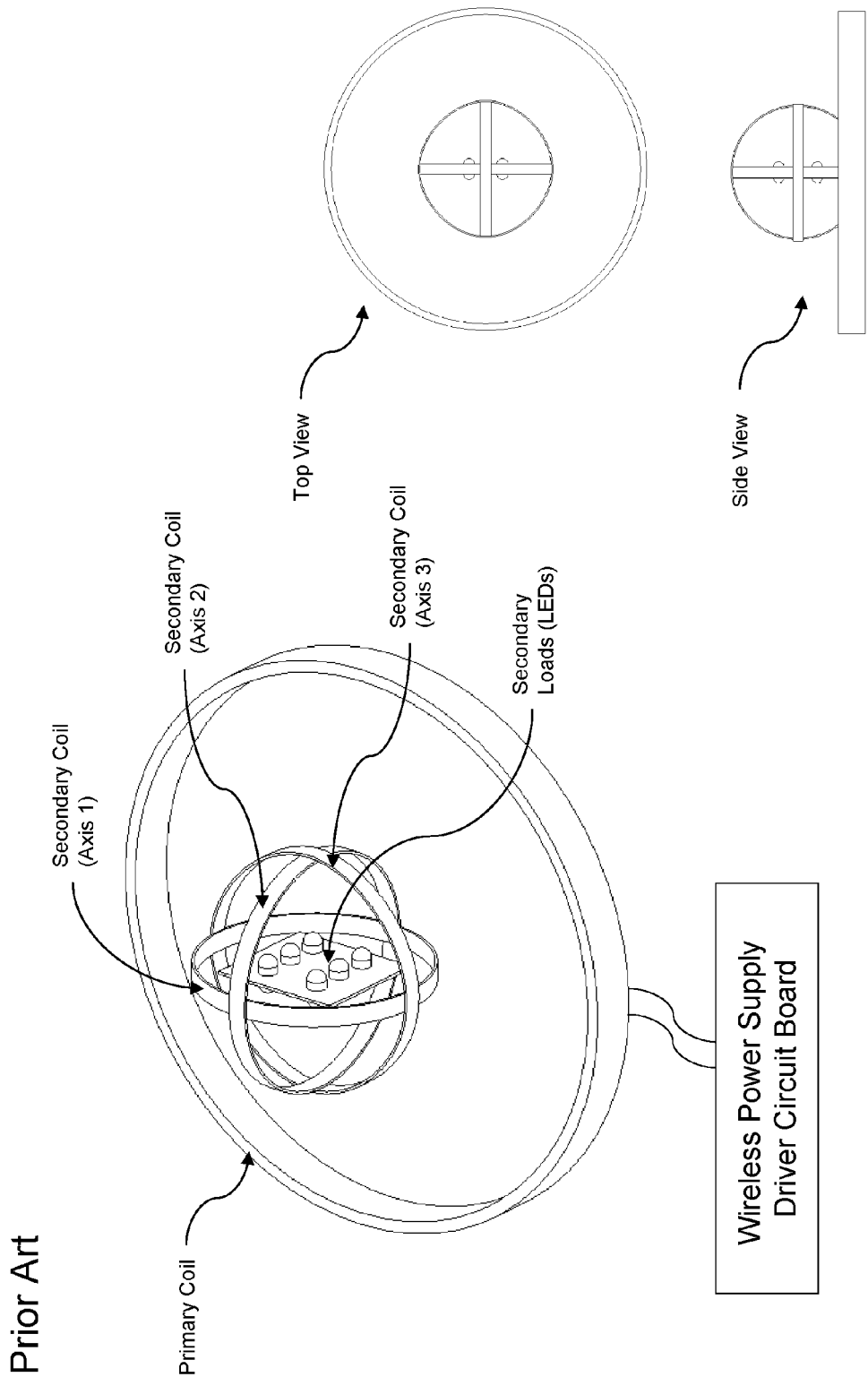
FIG. 1 is a perspective view of one embodiment of a prior art wireless power system.
Figure 2:
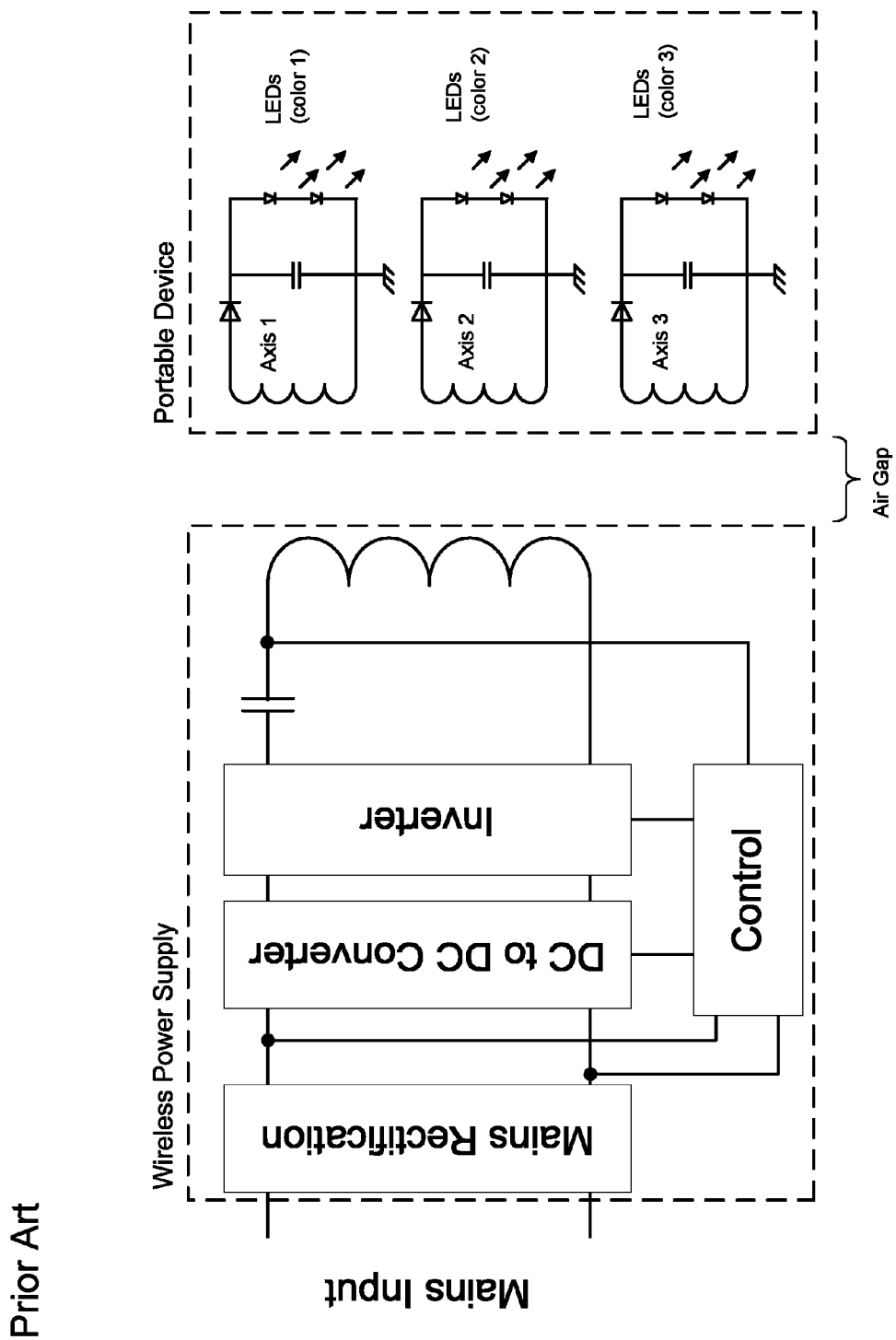
FIG. 2 is a schematic diagram of the one embodiment of the prior art wireless power system.
Figure 3:
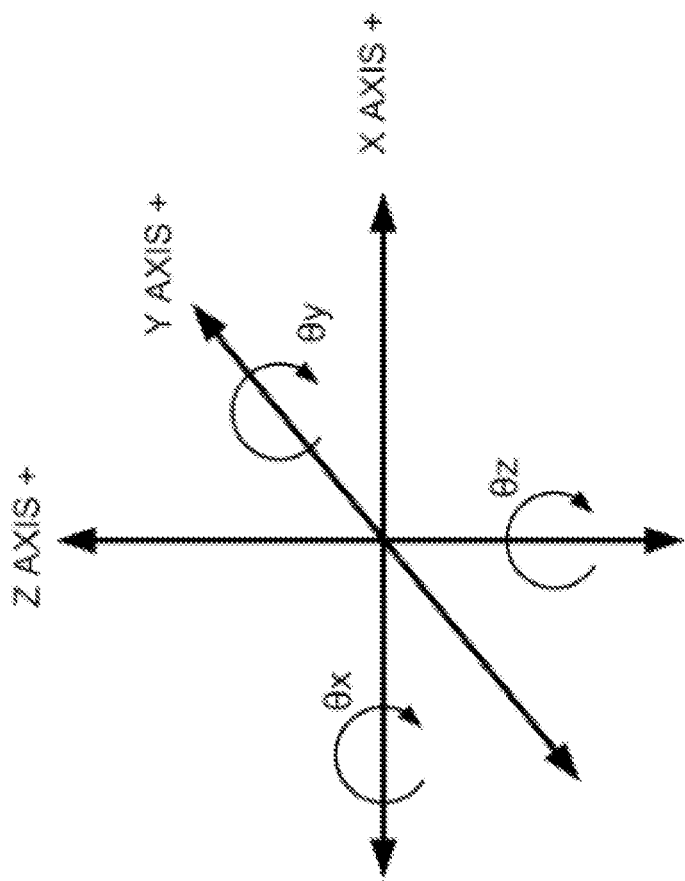
FIG. 3 is a view of a six-axes coordinate system.

Before the embodiments of the invention are described, it is pointed out that the invention is not limited in its application to the details of construction and the arrangement of the components set forth in the following description or illustrated in the drawings. The invention is capable of other embodiments and of being practiced or being carried out in various ways. Also, it is pointed out that the phraseology and terminology used herein are for the purpose of description and should not be regarded as limiting. The use of "including" and "comprising" and variations thereof is meant to encompass the items listed thereafter and equivalents thereof, as well as additional items and equivalents thereof.

Figure 4:
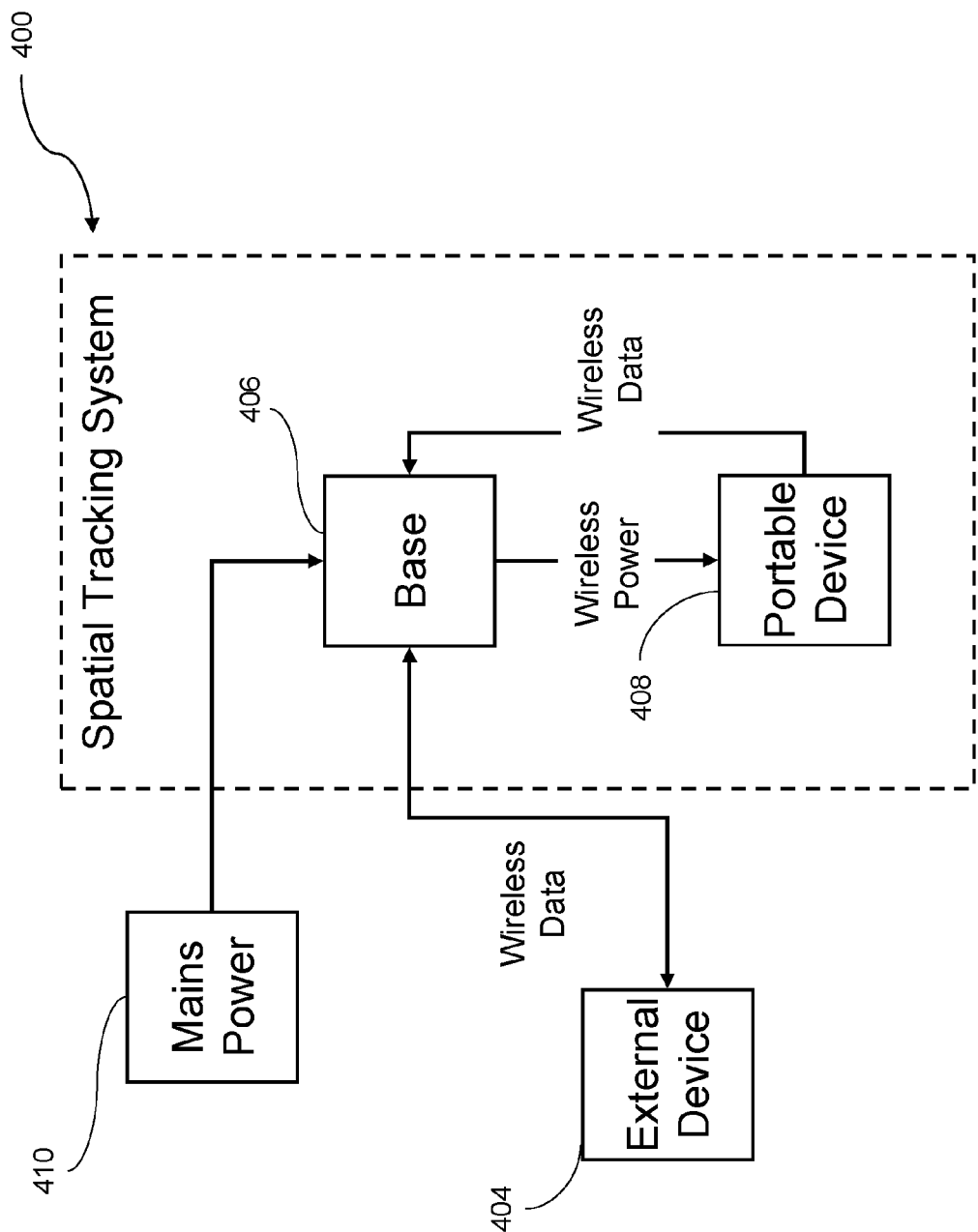
FIG. 4 is a schematic diagram of a first embodiment of the spatial tracking system.

An illustration of a spatial tracking system 400 for determining position and rotation in accordance with a first embodiment of the present invention is shown in FIG. 4. The spatial tracking system 400 includes a base station 406 and a portable device 408. The portable device 408 is separate and readily movable with respect to the base station 406. In one embodiment, the portable device 14 may be a computer mouse, cellular phone, video game controller, or any other type of user input device.

Base station 406 may be capable of receiving mains power 410 and producing an electromagnetic field used for determining rotation and a characteristic of position of the portable device 408 relative to the base station 406 or absolute rotation and a characteristic of absolute position with respect to the base station 406. A primary coil within the base station 406 may produce the electromagnetic field for inductive coupling with a secondary coil located within the portable device 408. In an alternative embodiment, the electromagnetic field may be used for simultaneously determining position and rotation of multiple portable devices 408 relative to the base station 406. In another alternative embodiment, the base station 406 may produce an electromagnetic field for powering or charging the portable device 408 circuitry, such as a battery, an accelerometer, a display, a transceiver, or a microcontroller. The electromagnetic field may also be used to simultaneously power a plurality of portable devices 408.

The base station 406 may include circuitry for receiving position and rotation data from the portable device 408. This position and rotation data may be raw sensor data, coordinate data, or other spatial data about the portable device 408 relative to the base station 406. The base station 406 may process this information and send it, via a wired or wireless connection, to an external device 404, such as a personal computer. In alternative embodiments, the base station 406 may be integrated with the external device 404 so that a separate base station 406 is not used.

The portable device 408 may include circuitry for sensing an electromagnetic field and determining its position and rotation based on the characteristics of the electromagnetic field. The portable device 408 may use a transmitter or transceiver to relay its position and rotation to the base station 406 for further processing. For example, the portable device 408 may be a three-dimensional (3D) computer mouse that determines its position and rotational angle relative to the base station 406 based on sensed characteristics of the electromagnetic field. The 3D computer mouse may then use a Bluetooth® transceiver to inform the base station 406 of its position and rotation. In alternative embodiments, the portable device 408 may also receive power from the electromagnetic field for supplying power to its own circuitry, such as for charging a battery or powering a processor and other sensors.

Figure 5:
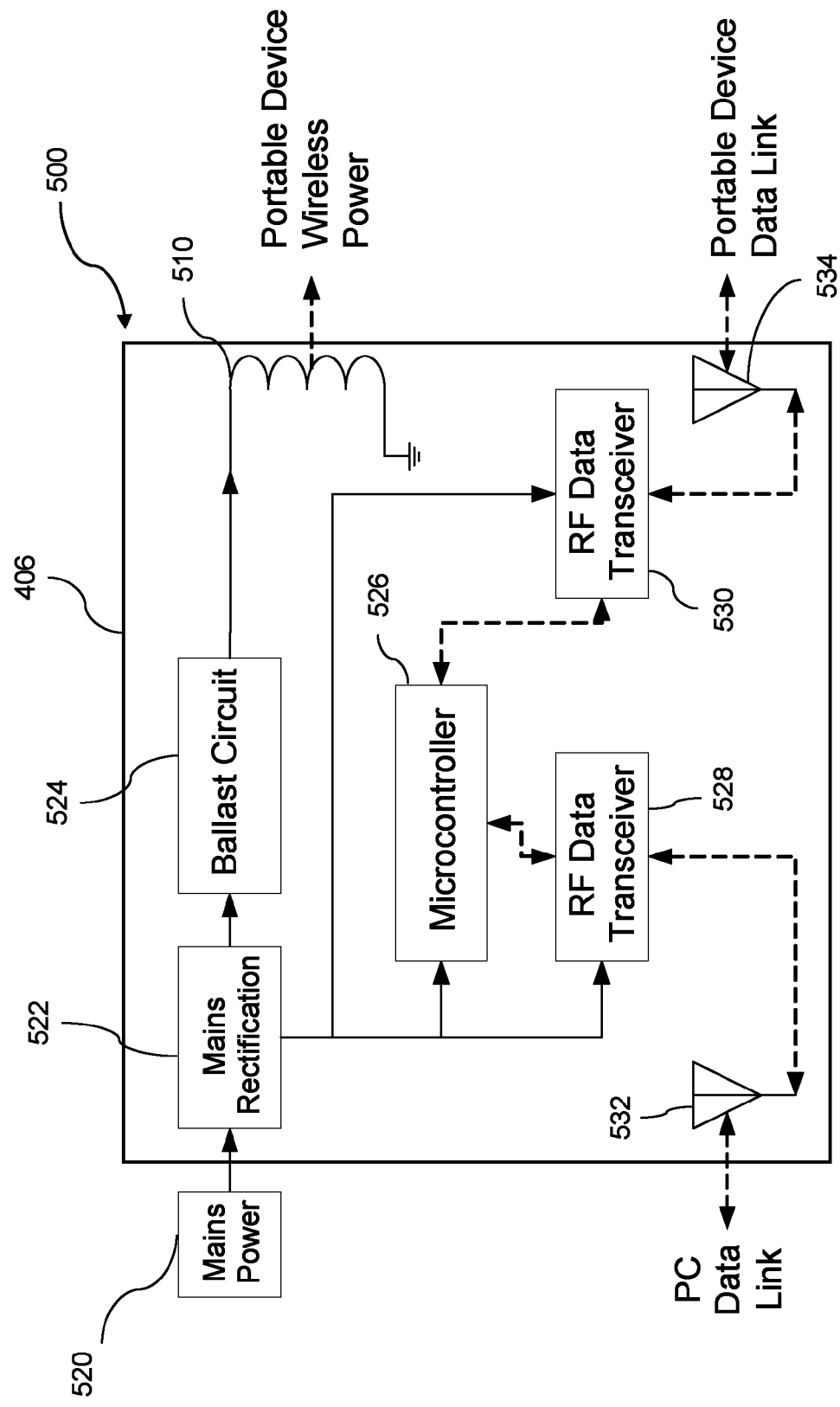
FIG. 5 is a schematic diagram of a first embodiment of a base station used in the first embodiment of the spatial tracking system.

FIG. 5 shows a schematic of the first embodiment of the spatial tracking system 500 with a base station 406 for generating an electromagnetic field used for determining position and rotation of a portable device. The base station 406 includes a primary coil 510, mains rectification circuitry 522, ballast circuit 524, base station microcontroller 526, computer RF data transceiver 528, computer link antenna 532, device RF data transceiver 530, and device link antenna 534. Mains rectification circuitry 522 may include circuitry well known in the art for converting mains power 520 to usable power for base station 406 components, where mains power 520 may be AC power, DC power, or any other suitable power source. The primary coil 510 may be made of a conductor capable of producing an electromagnetic field in response to an applied signal. The primary coil 510 may be a coiled conductor or an antenna capable of generating an electromagnetic field. For example, the primary coil 510 may be a coil formed from a PCB trace or Litz wire. In alternative embodiments, the base station 406 may include multiple primary coils 510 for producing multiple electromagnetic fields.

The ballast circuit 524 may include circuitry known in the art for driving primary coil 510 so that it produces an appropriate electromagnetic field for use in determining position and rotation of a portable device. In one embodiment, the ballast circuit 524 may also drive the primary coil 510 to produce an electromagnetic field suitable to inductively power or charge a portable device. For example, the base station 406 may incorporate the inductive power supply system disclosed in U.S. Application No. 61/019,411, entitled "Inductive Power Supply with Duty Cycle Control" and filed Jan. 7, 2008 by Baarman; U.S. Pat. No. 7,212,414, entitled "Adaptive Inductive Power Supply" and issued May 1, 2007 to Baarman; or U.S. application Ser. No. 10/689,148, entitled "Adaptive Inductive Power Supply with Communication" and filed Oct. 20, 2003 to Baarman—all of which are incorporated herein by reference in their entireties.

The base station microcontroller 526, computer RF data transceiver 528, computer link antenna 532, device RF data transceiver 530, and device link antenna 534 may include circuitry well known in the art for wirelessly communicating with the portable device and the external device. For example, wireless communication may be achieved using Bluetooth®, IEEE 802.11, or IrDA protocols and transmitters. The base station 406 may use device RF data transceiver 530 and device link antenna 534 to receive position and rotation data from the portable device. For example, the base station 406 may receive coordinate information from the portable device detailing the position of the portable device relative to the base station 406. In alternative embodiments, the base station 406 may use primary coil 510 to communicate with the portable device in addition to providing an electromagnetic field for determining position information. The device RF data transceiver 530 and device link antenna 534 may not be used in these embodiments. In one alternative configuration, a modulation technique may be used to transmit and receive information to the portable device using the primary coil 510.

In the current embodiment, the base station microcontroller 526 may receive position and rotation data from the device RF data transceiver 530 and process the data for transmission to the external device using computer RF data transceiver 528 and computer link antenna 532. The base station 406 may transmit position and rotation data, which relates to the portable device, to the external device in an appropriate format. For example, the base station 406 may receive position and rotation data regarding the position or movement of a 3D mouse and translate this information into a 3D mouse protocol packet to notify the external device of the 3D mouse's position or change in position.

Figure 6:
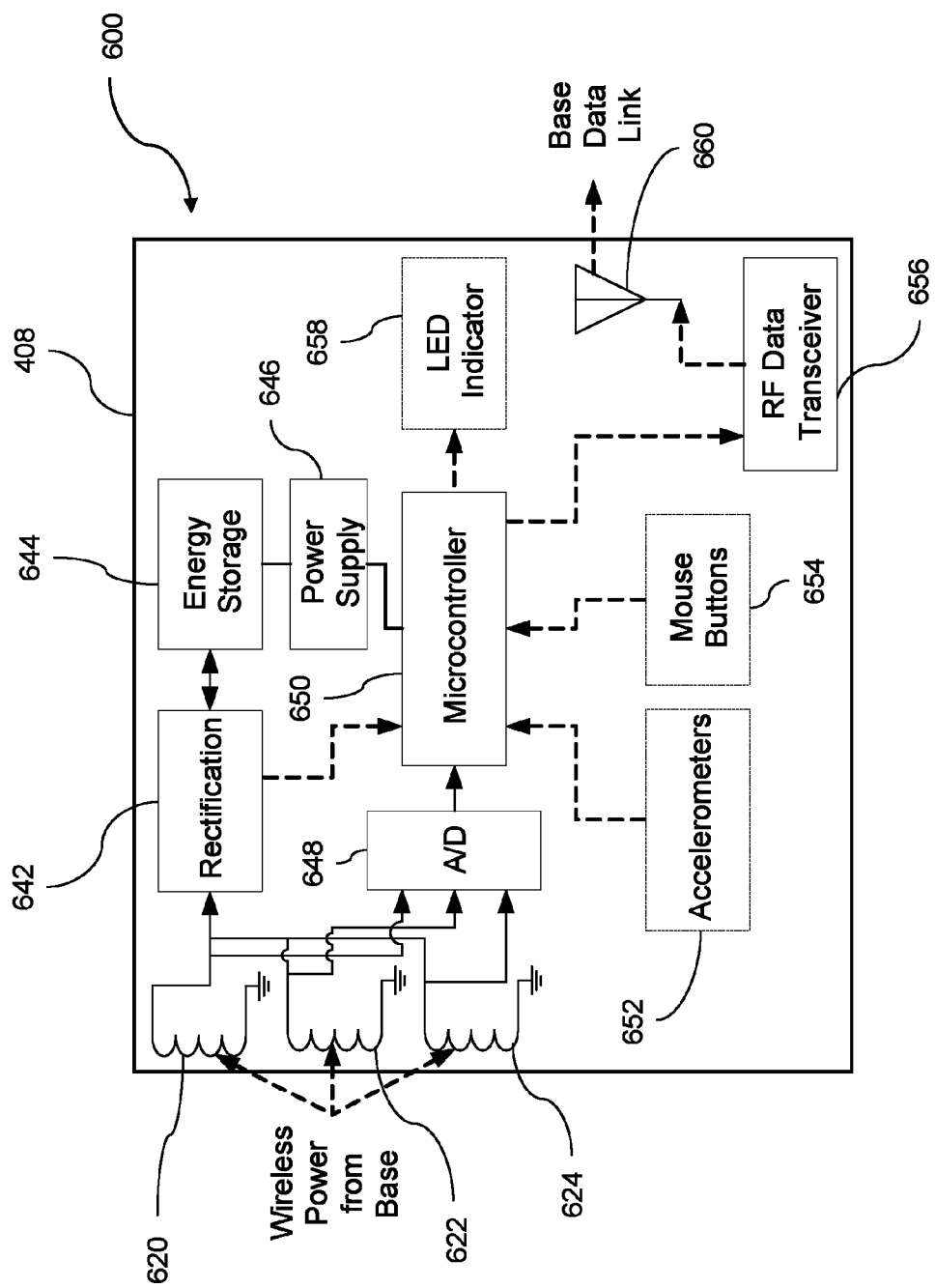
FIG. 6 is a schematic diagram of a first embodiment of a portable device used in the first embodiment of the spatial tracking system.
Figure 8B:
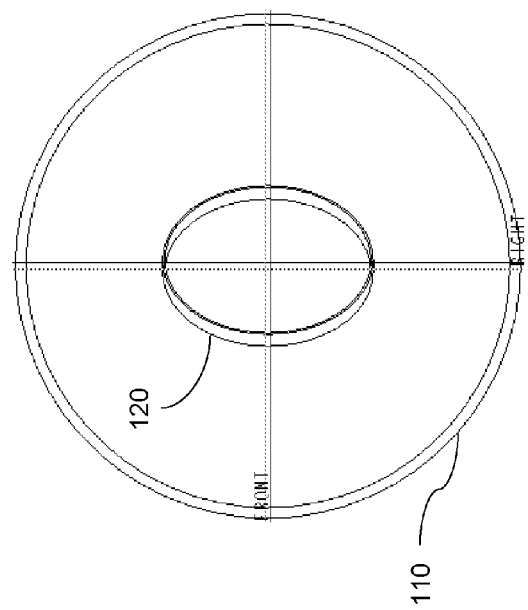
Figure 8C:
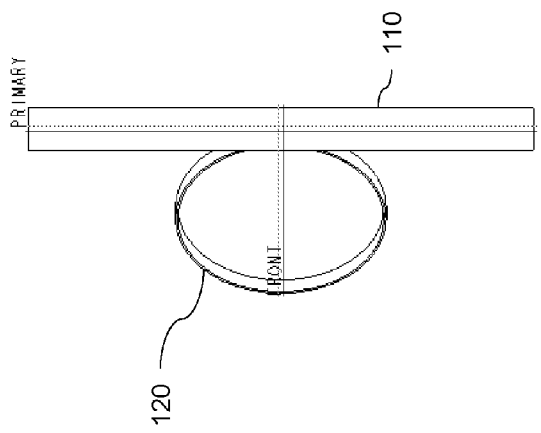
Figure 8D:
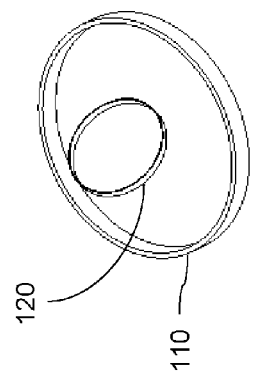
Figure 8A:
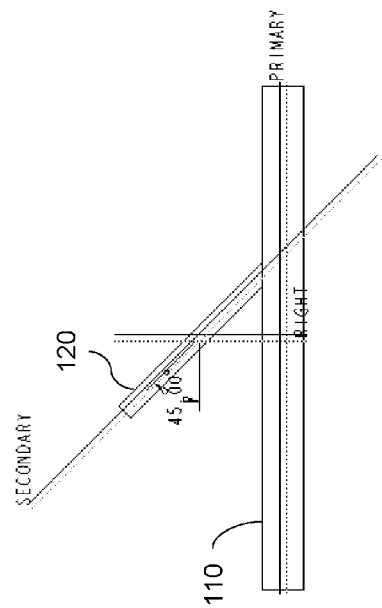
FIG. 8a is a front view of a near 45° arrangement of the secondary circuit relative to the primary coil plane of the second embodiment of the spatial tracking system.
Figure 17B:
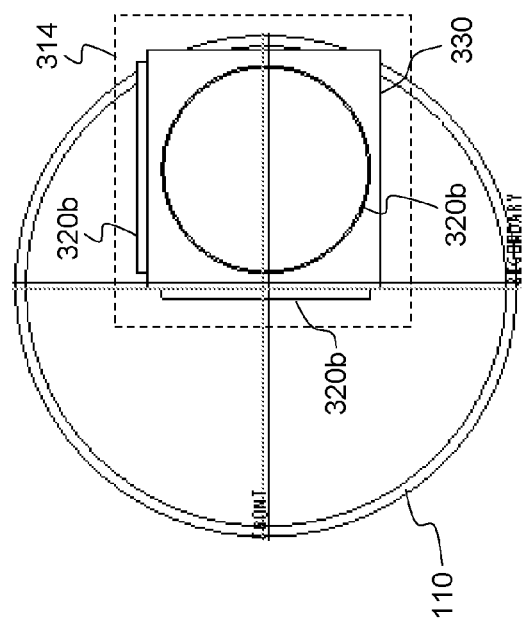
Figure 17C:
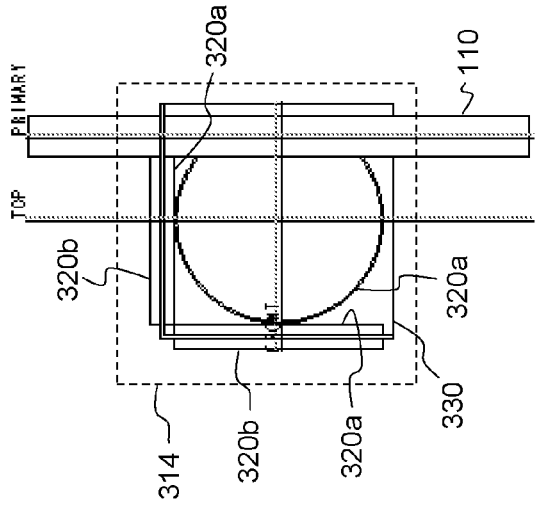
Figure 17A:
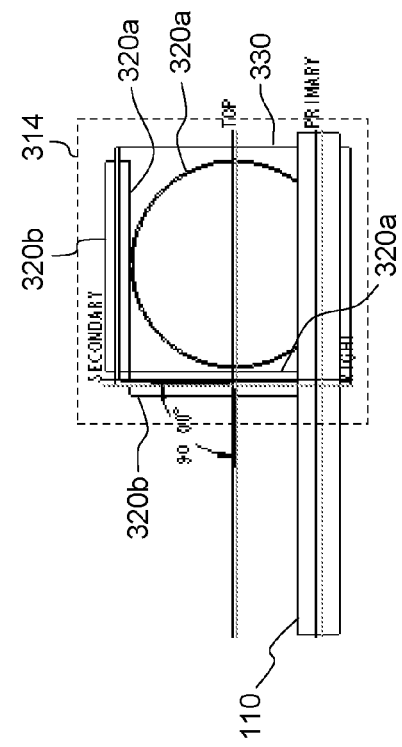
FIG. 17a is a front view of a near 90° arrangement of the X-axis coil of the secondary circuit relative to the primary coil plane of the fifth embodiment of the spatial tracking system.
Figure 17D:
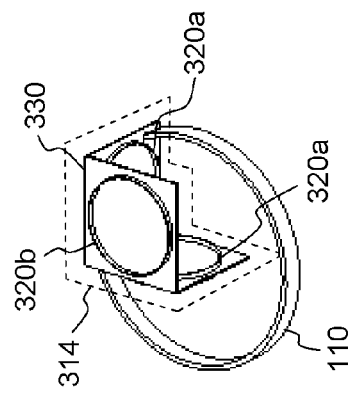

FIG. 6 shows a schematic of the first embodiment of the spatial tracking system 600 with a portable device 408 for sensing an electromagnetic field and for determining positional information about the portable device 408 relative to the base station. Portable device 408 may include axis-one secondary coil 620, axis-two secondary coil 622, and axis-three secondary coil 624 for sensing an electromagnetic field generated from a base station. The axis-one secondary coil 620, axis-two secondary coil 622, and axis-three secondary coil 624 may be similar to the primary coil 510 described with regard to FIG. 5. In alternative embodiments, the portable device 408 may include one, two, three, or more than three secondary coils similar to axis-one secondary coil 620, axis-two secondary coil 622, and axis-three secondary coil 624. In the current embodiment, the axis-one secondary coil 620, axis-two secondary coil 622, and axis-three secondary coil 624 may be orthogonal with respect to each other. As a result, the axis-one secondary coil 620, axis-two secondary coil 622, and axis-three secondary coil 624 may respectively represent the X-axis, Y-axis, and Z-axis. This orthogonal relationship may affect the ability to sense the electromagnetic field in each of the coils via inductive coupling with the primary coil. Further, the portable device 408 may determine its position, relative angle, or both based on the strength of inductive coupling with the primary coil. For example, the primary coil may have an angle relative to the portable device 408 such that the axis-one secondary coil 620 achieves a stronger inductive coupling with the primary coil than the axis-two secondary coil 622 or axis-three secondary coil 624. As another example, the magnitude of the electromagnetic field sensed by the axis-one secondary coil 620, axis-two secondary coil 622, and axis-three secondary coil 624 may allow the portable device 408 to determine its position or distance from the primary coil.

In alternative embodiments, the axis-one secondary coil 620, axis-two secondary coil 622, and axis-three secondary coil 624 may be respectively connected in series or parallel with resonant capacitors (not shown). These resonant capacitors may allow for greater sensitivity to electromagnetic fields because of their affect on impedance. As a result, the primary coil, axis-one secondary coil 620, axis-two secondary coil 622, and axis-three secondary coil 624 may operate at near resonance when the primary coil's operating frequency is near a resonant frequency of the spatial tracking system 600. Operating near resonance may improve the inductive coupling between the primary coil and at least one of the axis-one secondary coil 620, axis-two secondary coil 622, and axis-three secondary coil 624.

In the current embodiment, axis-one secondary coil 620, axis-two secondary coil 622, and axis-three secondary coil 624 may also receive power via inductive coupling with the primary coil in the base station. The orthogonal configuration of these coils may allow the portable device 408 to receive an appropriate amount of power regardless of its orientation relative to the base station. As a result, the portable device 408 may be powered wirelessly from the base station during use. The portable device 408 may be capable of receiving power wirelessly over various distances from the base station. For example, the portable device 408 may receive power wirelessly from the base station when within 12 inches of the center of the primary coil. When outside of this first range, the portable device 408 may use an energy storage element 644 or alternative power supply to power the portable device 408.

Additionally, the portable device 408 may determine position with respect to the base station based on the strength of inductive coupling when within range of the base station. This range may be the same or overlap the range that the portable device 408 may receive power wirelessly from the base station. For example, the portable device 408 may 1) determine position when within 12 inches from the base station and 2) receive power wirelessly when within 6 inches.

The portable device 408 may also include rectification circuitry 642, energy storage element 644, power supply 646, A/D converter 648, and device microcontroller 650. Rectification circuitry 642 may include circuitry well known in the art for receiving an AC signal from at least one of the axis-one secondary coil 620, axis-two secondary coil 622, and axis-three secondary coil 624 and rectifying that signal to supply energy storage element 644 with a suitable energy source. For example, rectification circuitry 642 may include a diode configuration for producing a half-wave signal to charge the energy storage element 644.

In alternative embodiments, the rectification circuitry 642 may include circuitry for supplying power directly to the device microcontroller 650 and other portable device 408 components in a suitable form. For example, the rectification circuitry 642 may convert a received AC signal to a DC signal, such as 3.3 VDC. Further, the rectification circuitry 642 may supply and receive power from the energy storage element 644 to maintain a suitable supply of power.

Energy storage element 644 may be a conventional capacitor, supercapacitor, or a battery. Energy storage element 644 may receive power from the rectification circuitry 642 and supply this power to the power supply 646 simultaneously or at another time. Power supply 646 may include circuitry well known in the art for conditioning input power into output power suitable for the device microcontroller 650 and other portable device 408 components. For example, power supply 646 may convert a 20 VDC or 1.5 VDC supply from the energy storage element 644 to a 3.3 VDC supply. In some embodiments, the power supply 646 may also include limiting and protection circuitry well known in the art for preventing overvoltage conditions or high current conditions.

A/D converter 648 may also include circuitry well known in the art for conditioning an input voltage signal for measurement and conversion to a digital representation of that measurement. For example, A/D converter 648 may receive a 15 V signal and scale it to a range between 0 V and 5 V. Subsequently, A/D converter 648 may make a measurement and convert that measurement to a binary number, which the device microcontroller 650 can process. A/D converter 648 may be connected to axis-one secondary coil 620, axis-two secondary coil 622, and axis-three secondary coil 624 to measure their operating characteristics, such as voltage. These operating characteristics may be indicative of the strength of the inductive coupling of the primary coil with the axis-one secondary coil 620, axis-two secondary coil 622, and axis-three secondary coil 624. After measuring operating characteristics, the A/D converter 648 may send the measurements to the device microcontroller 650 for processing.

The device microcontroller 650 may include circuitry well known in the art, such as a processor, memory, and peripheral I/O, for controlling operations of the portable device 408 related to determining and communicating position and rotation data. The device microcontroller 650 may receive information from the A/D converter 648 representing the strength of inductive coupling between the primary coil and at least one of the axis-one secondary coil 620, axis-two secondary coil 622, and axis-three secondary coil 624. Based on this information, the device microcontroller 650 may determine the angles of rotation of the portable device 408 about the X-axis, Y-axis, and Z-axis relative to the primary coil. In alternative embodiments, the device microcontroller 650 may also determine position relative to the primary coil using information related to the strength of the inductive coupling between the primary coil and at least one of the axis-one secondary coil 620, axis-two secondary coil 622, and axis-three secondary coil 624.

In the current embodiment, the portable device 408 may include a base station RF data transceiver 656 and base link antenna 660. The base station RF data transceiver 656 and base link antenna 660 may include circuitry well known in the art for wirelessly communicating with the base station. The portable device 408 may transmit position information to the base station using the base station RF data transceiver 656 and base link antenna 660. In an alternative embodiment, the portable device 408 may communicate with the base station using at least one of the axis-one secondary coil 620, axis-two secondary coil 622, and axis-three secondary coil 624. In these configurations, the portable device 408 may not use the base station RF data transceiver 656 and base link antenna 660.

In another alternative embodiment, the portable device 408 may include an accelerometer 652 or multiple accelerometers arranged in multiple axes. The accelerometer 652 may be capable of producing outputs correlating to acceleration in at least one of the X-axis, Y-axis, and Z-axis directions. These outputs may be used to determine relative displacement of the portable device 408. Alternatively, the accelerometer 652 may determine rotation of the portable device 408 based the effect of gravity. In yet another alternative embodiment, the portable device 408 may include a gyroscope for determining rotation of the portable device 408.

In the current embodiment, the accelerometer 652 may communicate its sensor output to the device microcontroller 650. Accelerometer 652 information may provide relative position or rotation data, which may be prone to drift. Drift may also occur with other sensors used in alternative embodiments. The relative spatial information of the accelerometer 652 may be combined with the absolute spatial information determined from inductive coupling with the primary coil to link absolute spatial information and relative spatial information. By linking the absolute spatial information with the relative spatial information, the spatial tracking system may compensate for drift and provide improved accuracy. For example, the microcontroller 650 may use acceleration information in combination with the inductive coupling strength information from at least one of the axis-one secondary coil 620, axis-two secondary coil 622, and axis-three secondary coil 624 to determine rotation and position about the X-axis, Y-axis, and Z-axis.

In another alternative embodiment, the portable device 408 may include mouse buttons 654 and an LED indicator 658. Mouse buttons 654 and LED indicator 658 may comprise circuitry well known in the art for respectively providing input and output capabilities to a user of the portable device 408. For example, the portable device 408 may be a 3D mouse with mouse buttons 654 for allowing a user to perform selections on a computer. In addition, the LED indicator 658 may be used to provide the user with status information. Status information may include feedback for the user, such as an indication of the range of the electromagnetic field, battery life, features for game play, or other programmed uses. In some alternative embodiments, the portable device 408 may include other feedback devices, such as rumble packs, force feedback, or electric shock to provide information to the user. For example, the portable device 408 may vibrate in response to an error. In another example, the portable device 408 may use force feedback to create an opposing force when the mouse or mouse cursor reaches a boundary, such as the end of the electromagnetic field or the end of a window in a graphical user interface.

Referring now to FIGS. 7a-9d, a second embodiment of the spatial tracking system includes a primary coil 110 and a secondary coil 120. The primary coil 110 and secondary coil 120 may be similar to the primary coil 510 and axis-one secondary coil 620 discussed with regard to FIGS. 5-6. The secondary coil 120 is shown close to above center relative to the primary coil 110, but it may be located in any position relative to the primary coil 110. For example, the secondary coil 120 may be located off-center relative to the primary coil 110 or outside the boundaries of the primary coil 110.

The primary coil 110 and the secondary coil 120 may be used for determining rotation of the secondary coil 120 relative to the primary coil 110. In the current embodiment, the relative strength of the inductive coupling between the primary coil 110 and secondary coil 120 may be used to determine the secondary coil's angle relative to the primary coil. For purposes of disclosure, the primary coil 110 and secondary coil 120 are described separately, but they may be respectively located within any type of base station and portable electronic device.

In alternative embodiments, the relative strength of the inductive coupling between the primary coil 110 and secondary coil 120 may be used to determine the position of the secondary coil 120 relative to the primary coil 110. In these alternative embodiments, the characteristics of inductive coupling between the secondary coil 120 and the primary coil 110 may vary as the distance between the two changes. For example, the relative strength of inductive coupling between the primary coil 110 and secondary coil 120 may weaken as the secondary coil 120 moves farther away from the primary coil 110, which may result in a drop in power received by the secondary coil 120. As a result, position may be derived from the relative strength of the inductive coupling between the primary coil 110 and secondary coil 120.

In other alternative embodiments, primary coil 110 and secondary coil 120 may be used for inductively powering a portable device. The portable device, which includes the secondary coil 120, may wirelessly receive power via the inductive coupling between the primary coil 110 and secondary coil 120 to power its own circuitry, such as battery charging circuitry, displays, microcontrollers, and other peripheral circuits. In these alternative embodiments, the inductive coupling may be used to 1) determine position and rotation and 2) power circuitry for operating the portable electronic device.

FIGS. 7*a*-*d* show the second embodiment of the spatial tracking system with the secondary coil 120 substantially parallel to a plane of the primary coil 110. Electronic circuitry (not shown) may determine the relative angle of the secondary coil 120 to the primary coil 110 based on characteristics of the inductive coupling between the secondary coil 120 and the primary coil 110. For example, the relative strength of coupling at a near 0° angle may be larger than if the secondary coil 120 is close to a 15° angle. As a result, the amount of power received at the secondary coil 120 may be different in the near 0° configuration versus the near 15° configuration, which may be used to determine the angle of the secondary coil 120 relative to the primary coil 110.

FIGS. 8*a*-*d* show the second embodiment of the spatial tracking system with the secondary coil 120 at a near 45° angle relative to the plane of the primary coil 110. At near 45° relative to the primary coil 110, the primary coil 120 may receive power via inductive coupling. Electronic circuitry (not shown) may determine that the secondary coil 120 is at a near 45° angle based on characteristics of inductive coupling between the secondary coil 120 and the primary coil 110. Similar to the embodiments of FIGS. 7*a*-*d* described above, the relative strength of inductive coupling between the primary coil 110 and the secondary coil 120 at a near 45° angle may be different than the relative strength of inductive coupling at another angle. Accordingly, the electronic circuitry (not shown) may identify the secondary coil 120 as being at a near 45° angle based on the relative strength of inductive coupling.

Referring now to FIGS. 9*a*-11*d*, a third embodiment of the spatial tracking system includes a primary coil 110 and a secondary circuit 212. The secondary circuit 212 includes a first secondary coil 220*a*, a second secondary coil 220*b*, and a shield 230. The primary coil 110 may be similar to the primary coil 110 described with regard to FIGS. 7*a*-8*d*. The first secondary coil 220*a* and second secondary coil 220*b* may also be similar to the secondary coil 120 described with regard to FIGS. 7*a*-9*d*. The primary coil 110 and secondary circuit 212 may be used for determining position and rotation of the secondary circuit 212 relative to the primary coil 110. The shield 230 may be made of materials, such as ferrite, magnetic amorphous film, compression molded iron powder, or another material capable of appreciably affecting an electromagnetic field.

In the current embodiment, the shield 230 may be located between the first secondary coil 220*a* and the second secondary coil 220*b*, where the first secondary coil 220*a* and second secondary coil 220*b* are parallel to each other. The shield 230 may prevent appreciable amounts of magnetic flux from passing through such that the spatial tracking system may determine whether the first secondary coil 220*a* or second secondary coil 220*b* is substantially facing the primary coil 110. Using this configuration, the spatial tracking system may determine the angle of the secondary circuit 212 relative to the primary coil 110 based on characteristics of inductive coupling between the primary coil 110 and each of the first secondary coil 220*a* and second secondary coil 220*b*.

For purposes of disclosure, the shield 230, primary coil 110, first secondary coil 220*a* and second secondary coil 220*b* are described separately. However, it is understood that these components may be included in essentially any type of base station and portable device combination capable of determining position and rotation via measuring strength of inductive coupling. In alternative embodiments, the primary coil 110 and base station may be capable of providing enough power to the portable device to wirelessly power its components, such as a battery, processor, and sensors.

FIGS. 9*a*-*d* show the third embodiment of the spatial tracking system including a secondary circuit 212 that is substantially parallel to a plane of the primary coil 110. At a near 0° angle, the second secondary coil 220*b* that faces the primary coil 110 may be noticeably coupled with the primary coil 110. Accordingly, the spatial tracking system may determine based on the relative strength of the inductive coupling with each of the first secondary coil 220*a* and second secondary coil 220*b* that the secondary circuit 212 is near 0° relative to the primary coil 110. Similar to the embodiments described above with regard to FIGS. 7*a*-8*d*, if the secondary circuit 212 were to tilt 15°, then the spatial tracking system may determine this change in angle based on the change in relative strength of the inductive coupling.

In the current embodiment, the spatial tracking system may also use the shield to create an appreciable difference in inductive coupling between the first secondary coil 220*a* and second secondary coil 220*b* depending on the angle of the secondary circuit 212 relative to the primary coil 110. The secondary coil substantially facing the primary coil 110 may have improved inductive coupling with the primary coil 110 over the secondary coil not substantially facing the primary coil 110. This may allow the spatial tracking system to determine the angle of the secondary circuit 212 based on the strength of inductive coupling of the first secondary coil 220*a* and second secondary coil 220*b*. For example, when the secondary circuit 212 is at a 180° angle relative to the primary circuit 110, the first secondary coil 220*a* may be noticeably coupled with the primary coil 110 such that the strength of the inductive coupling with the first secondary coil 220*a* may be appreciably different than the strength of inductive coupling with the second secondary coil 220*b*. As a result, the spatial tracking system may determine that the secondary circuit 212 is at a 180° angle rather than a 0° angle relative to the primary coil 110.

FIGS. 10*a*-*d* show the third embodiment of the spatial tracking system including a secondary circuit 212 that is at a near 45° angle relative to the plane of the primary coil 110. Similar to the embodiments described above with regard to FIGS. 10*a*-*d*, the spatial tracking system may determine that the secondary circuit 212 is at a near 45° angle and that second secondary coil 220b is substantially facing the primary coil 110 based on the relative strength of the inductive coupling between the second secondary coil 220b and the primary coil 110. Accordingly, the strength of the inductive coupling between the first secondary coil 220a and the primary coil 110 is appreciably different such that the spatial tracking system may determine that the first secondary coil 220a is facing substantially away from the primary coil 110.

FIGS. 11a-d the third embodiment of the spatial tracking system including a secondary circuit 212 that is at a near 90° angle relative to the plane of the primary coil 110. In this configuration, the strength of the inductive coupling between the secondary circuit 212 and the primary coil 110 may be relatively weak. As a result, the spatial tracking system may identify the secondary circuit 212 as being at a near 90° angle based on the relative strength of the inductive coupling. At this angle, neither the first secondary coil 220a nor the second secondary coil 220b is substantially facing the primary coil 110, and both of them may be similarly, inductively coupled with the primary coil 110.

Various configurations of the fourth and fifth embodiments of the spatial tracking system are shown in FIGS. 12a-17d. These embodiments may be used to determine, relative to the primary coil 110, an angle of rotation of an object about more than one axis, such as the X-axis, Y-axis, and Z-axis. The spatial tracking system may include a primary coil 110 and a plurality of secondary circuits 312. The plurality of secondary circuits 312 may be attached together to produce an inductive receiver assembly 314 used for determining position and rotation of an object. Each secondary circuit 312 may include a shield 330 between a first secondary coil 320a and a second secondary coil 320b. The first secondary coil 320a and second secondary coil 320b may be configured similarly to the secondary coils 120, 220a-b described above with regard to FIG. 7a-11d. Further the primary coil 110 may be similar to the primary coil 110 described in previous embodiments.

The shield 330 may be formed of a material with similar properties to the shield described with regard to FIGS. 9a-11d. The shield 330 prevents appreciable amounts of magnetic flux from passing through such that the spatial tracking system may determine position and angle of rotation of each of the plurality of secondary circuits 312 relative to the primary coil 110.

For purposes of disclosure, the shield 330, primary coil 110, and inductive receiver assembly 314 are described separately. However, these components may be included in essentially any type of base station and portable device combination capable of determining position information via inductive coupling. In alternative embodiments, the primary coil 110 and inductive receiver assembly may be capable of transferring power sufficient to power the portable device. For example, the portable device may wirelessly receive enough energy to power a battery charging circuit, display, or microcontroller circuit.

Referring to the fourth and fifth embodiments of FIGS. 12a-17d, the inductive receiver assembly 314 may include three secondary circuits 312. In this configuration, each of the secondary circuits 312 is orthogonally situated with respect to each other. As a result, the inductive receiver assembly 314 may include secondary circuits 312 that are each respectively parallel to an X-axis, Y-axis, and Z-axis relative to the primary coil 110.

As shown in FIGS. 12a-14d, the fourth embodiment may be configured such that each of the secondary circuits 312 may form an inductive receiver assembly 314 with a six-faced surface that resembles a cube. Each of the faces may be attached to either a first secondary coil 320a or a second secondary coil 320b, where there is a shield 330 between each pair of the first secondary coil 320a and second secondary coil 320b that form a secondary circuit 312.

As shown in FIGS. 15a-17d, the fifth embodiment may be configured such that each of the three secondary circuits 312 may have one edge connected to one secondary circuit 312 and another edge connected to another secondary circuit 312. In this configuration, inductive receiver assembly 314 has three secondary circuits 312 that are orthogonal to each other. Accordingly, the spatial tracking system 1600 may determine an angle of rotation of an object about an X-axis, Y-axis, and Z-axis.

FIGS. 12a-d and 15a-d respectively show the fourth and fifth embodiments of the spatial tracking system including a plurality of secondary circuits 312, where one secondary circuit 312 is substantially parallel to the X-axis of the primary coil 110. With a secondary circuit 312 substantially parallel to the X-axis and the second secondary coil 320b facing the primary coil 110, the spatial tracking system may determine based on relative strength of the inductive coupling that inductive receiver assembly 314 is near 0° relative to the X-axis plane of the primary coil 110. If the inductive receiver assembly 314 were to tilt 15° about the X-axis, then the spatial tracking system may determine the change in angle based on the relative strength of the inductive coupling.

In the current embodiments, the spatial tracking system may determine the angle of rotation of the inductive receiver assembly 314 about the X-axis plane of the primary coil 110. The shield 330 may appreciably affect inductive coupling between the primary coil 110 and the secondary coils not substantially facing the primary coil 110. For example, if the inductive receiver assembly were to tilt 180° about the X-axis of the primary coil 110, then the spatial tracking system would determine, based on the strength of inductive coupling, that a second secondary coil 320b is noticeably coupled with the primary coil 110. In this circumstance, the coupling with the second secondary coil 320b may be greater than the coupling with the first secondary coil 320a so that the spatial tracking system can determine the angle of rotation as 180° rather than 0°.

FIGS. 13a-d and 16a-d respectively show the fourth and fifth embodiments of the spatial tracking system including a plurality of secondary circuits 312, where at least one secondary circuit 312 is near 45° relative to the X-axis of primary coil 110. The spatial tracking system may determine that the receiver assembly 314 is close to 45° relative to the X-axis based on the relative strength of inductive coupling with the plurality of secondary circuits 312. Further, if the receiver assembly 314 were near −135° relative to the X-axis, the strength of inductive coupling between a pair of a first secondary coil 320a and a second secondary coil 320b may be appreciably different. Accordingly, the spatial tracking system may determine that the receiver assembly is near −135° rather than 45°.

FIGS. 14a-d and 17a-d respectively show the fourth and fifth embodiments of the spatial tracking system including a plurality of secondary circuits 312, where at least one secondary circuit 312 is near 90° relative to the X-axis of the primary coil 110. The spatial tracking system may determine that the receiver assembly 314 is close to 90° based on the inductive coupling between at least one secondary circuit 312 and the primary coil 110 being relatively weak. At a near 90°, neither the first secondary coil 320a nor second secondary coil 320b of the at least one secondary circuit 312 are substantially coupled to the primary coil 110. Accordingly, the spatial tracking system may determine the angle of the receiver assembly 314 in this configuration.

The above description is that of the current embodiments of the inventions. Various alterations and changes can be made without departing from the spirit and broader aspects of the invention. It is pointed out that the inventions disclosed herein extend to all alternative combinations of two or more of the individual features mentioned or evident from the text and/or drawings. All of these different combinations constitute various alternative aspects of the present inventions.

The invention claimed is:

1. A portable device for tracking spatial information, comprising:
    at least one secondary that, when placed within an external electromagnetic field generated by a primary, receives wireless power from the primary, via said external electromagnetic field, to supply energy to device circuitry of said portable device;
    at least one sensor coupled to said at least one secondary, wherein, when said at least one secondary is placed within said external electromagnetic field, said at least one sensor measures a strength characteristic of said external field received by said at least one secondary, and provides sensor output indicative of said strength characteristic of said external field;
    a controller operatively coupled to said at least one secondary and said at least one sensor, wherein said controller is programmed to determine spatial information about said portable device based on said sensor output indicative of said strength characteristic of said external field, wherein said spatial information includes tilt information about said portable device relative to the primary, wherein said controller is powered by said wireless power received via said at least one secondary; and
    wherein said portable device, including said at least one sensor, is separable from and readily movable with respect to the primary, wherein said controller is programmed to determine, based on sensor output from said at least one sensor of the portable device, said spatial information about said portable device relative to the primary.

2. The portable device of claim 1, wherein said spatial information includes an additional characteristic of position.

3. The portable device of claim 2, wherein said strength characteristic changes based on an angle of said secondary relative to said external magnetic field.

4. The portable device of claim 2, wherein said strength characteristic changes based on a characteristic of position of said secondary relative to said external magnetic field.

5. The portable device of claim 1, further comprising at least one additional sensor that provides additional spatial information about said portable device, wherein said controller uses said additional spatial information to determine said spatial information.

6. The portable device of claim 5, wherein said spatial information is correlated with said additional spatial information to improve said additional spatial information from said at least one sensor.

7. The portable device of claim 1, wherein said at least one secondary includes three secondaries orthogonally situated with respect to each other.

8. The portable device of claim 1, wherein each of the at least one secondary includes two secondary coils separated by a shield.

9. A system for tracking spatial information about a portable device, comprising:
    a primary that produces an electromagnetic field for transmission of wireless power to said portable device;
    said portable device including at least one secondary that forms an inductive coupling with said primary in order to receive said wireless power from said primary, said portable device including at least one sensor coupled to said at least one secondary and a control system powered by said wireless power received from said primary, wherein said at least one sensor measures a strength characteristic of said inductive coupling between said at least one secondary and said primary; wherein said at least one sensor provides sensor output indicative of said strength characteristic of said inductive coupling;
    wherein said control system of said portable device determines spatial information about said portable device based on said sensor output indicative of said strength characteristic of said inductive coupling, wherein said spatial information includes tilt information about said portable device relative to the primary; and
    wherein said portable device, including said at least one sensor, is separable from and readily movable with respect to the primary, wherein said controller is programmed to determine, based on sensor output from said at least one sensor of the portable device, said spatial information about said portable device relative to said primary, wherein said at least one secondary powers said control system with said wireless power received from said primary.

10. The system of claim 9, further comprising an additional sensor capable of providing sensor information about said portable device, wherein said portable device uses said sensor information to determine said spatial information.

11. The system of claim 10, wherein said sensor information and said spatial information are compared to compensate for drift in said sensor information.

12. The system of claim 9, wherein said spatial information includes at least one of pitch, roll, yaw, and a characteristic of position relative to said primary.

13. The system of claim 9, wherein each of said at least one secondary includes two secondary coils separated by a shield.

14. A portable device for tracking spatial information, comprising:
    at least one secondary that, when placed within an external electromagnetic field generated by a primary, receives wireless power from the primary, via said external electromagnetic field, to supply energy to device circuitry of said portable device;
    at least one sensor coupled to said at least one secondary, wherein, when said at least one secondary is placed within said electromagnetic field, said at least one sensor measures a strength characteristic of said external field received by said at least one secondary, and provides sensor output indicative of said strength characteristic of said external field, wherein said sensor output is indicative of tilt information of the portable device relative to the primary;
    a controller operatively coupled to said at least one secondary and said at least one sensor, said controller programmed to determine spatial information about said portable device based on said sensor output indicative of said strength characteristic of said external field, wherein said controller is programmed to determine said spatial information, wherein said controller is powered by said wireless power received via said at least one secondary; and
    wherein said portable device, including said at least one sensor, is separable from and readily movable with respect to the primary, wherein said controller is programmed to determine, based on sensor output from said at least one sensor of the portable device, said spatial information about said portable device relative to the primary.

15. The portable device of claim 14, wherein said spatial information includes at least one of tilt information and rotation information.

16. The portable device of claim 15, wherein said strength characteristic changes based on an angle of said secondary relative to said external magnetic field.

17. The portable device of claim 15, wherein said strength characteristic changes based on a characteristic of position of said secondary relative to said external magnetic field.

18. The portable device of claim 14, further comprising at least one additional sensor for providing additional spatial information about said portable device, wherein said controller uses said additional spatial information to determine said spatial information.

19. The portable device of claim 18, wherein said spatial information is correlated with said additional spatial information to improve said additional spatial information from said at least one sensor.

20. The portable device of claim 1, wherein said controller programmed to determine said spatial information absent direct contact between said portable device and a power transfer surface associated with the primary.

* * * * *